(12) United States Patent
Higa et al.

(10) Patent No.: US 12,229,485 B2
(45) Date of Patent: Feb. 18, 2025

(54) ASSIST APPARATUS, DESIGN ASSIST METHOD, DESIGN ASSIST SYSTEM, AND COMPUTER READABLE MEDIUM

(71) Applicant: Asahi Kasei Microdevices Corporation, Tokyo (JP)

(72) Inventors: Takaya Higa, Tokyo (JP); Taisuke Fujita, Tokyo (JP)

(73) Assignee: Asahi Kasei Microdevices Corporation, Tokyo (JP)

( * ) Notice: Subject to any disclaimer, the term of this patent is extended or adjusted under 35 U.S.C. 154(b) by 606 days.

(21) Appl. No.: 17/457,243

(22) Filed: Dec. 1, 2021

(65) Prior Publication Data

US 2022/0171909 A1 Jun. 2, 2022

(30) Foreign Application Priority Data

Dec. 2, 2020 (JP) ................. 2020-200192

(51) Int. Cl.
  *G06F 30/337* (2020.01)
  *G06F 30/33* (2020.01)
  *G06F 119/08* (2020.01)

(52) U.S. Cl.
  CPC ............ *G06F 30/337* (2020.01); *G06F 30/33* (2020.01); *G06F 2119/08* (2020.01)

(58) Field of Classification Search
  CPC .... G06F 30/337; G06F 30/33; G06F 2119/08; G06F 30/367; G06F 30/20; G06F 30/12; G01R 31/2817
  See application file for complete search history.

(56) References Cited

U.S. PATENT DOCUMENTS

| 5,659,244 A * | 8/1997 | Sakaguchi ......... G01R 31/3004 |
| | | 324/754.21 |
| 6,513,000 B1 * | 1/2003 | Toda ...................... H01L 23/34 |
| | | 703/2 |

(Continued)

FOREIGN PATENT DOCUMENTS

| CN | 117950370 A * | 4/2024 | ............. G06F 30/20 |
| DE | 102021213690 A1 * | 6/2022 | ............. G06F 30/33 |

(Continued)

OTHER PUBLICATIONS

D. E. Riemer, "Electrical equivalent method for thermal stress analysis," Proceedings., 39th Electronic Components Conference, Houston, TX, USA, 1989, pp. 869-874, doi: 10.1109/ECC.1989. (Year: 1989).*

(Continued)

*Primary Examiner* — Stacy Whitmore

(57) ABSTRACT

There is provided a design assist apparatus including an inputting unit configured to input an analysis condition including substrate information of a thermal analysis target and current detection element information, and a display control unit configured to control a display unit to display, on the display unit, a thermal analysis result based on the analysis condition, in which the display control unit is configured to control the display unit to display, on the display unit and in a mutually identifiable manner, a first thermal analysis result based on a first analysis condition input by the inputting unit and a second thermal analysis result based on a second analysis condition obtained by changing at least one of the substrate information and the current detection element information from the first analysis condition.

18 Claims, 16 Drawing Sheets

(56) References Cited

U.S. PATENT DOCUMENTS

| | | | | |
|---|---|---|---|---|
| 7,398,497 | B2* | 7/2008 | Sato | G06F 30/367 716/112 |
| 8,103,996 | B2* | 1/2012 | Kariat | G06F 30/367 716/100 |
| 8,108,191 | B1* | 1/2012 | Britch | G06F 30/20 388/813 |
| 8,543,952 | B2* | 9/2013 | Kariat | G06F 30/367 716/110 |
| 10,762,267 | B2* | 9/2020 | Kamon | G06F 30/23 |
| 2002/0103628 | A1* | 8/2002 | Leslie | G06F 30/00 703/1 |
| 2003/0014725 | A1* | 1/2003 | Sato | G06F 30/30 716/112 |
| 2003/0154048 | A1 | 8/2003 | Amick | |
| 2004/0073397 | A1* | 4/2004 | Matsuyama | G06F 30/23 702/136 |
| 2005/0086626 | A1* | 4/2005 | Sato | G06F 30/367 716/112 |
| 2005/0102117 | A1* | 5/2005 | Habitz | G06F 30/367 702/133 |
| 2009/0019411 | A1* | 1/2009 | Chandra | G06F 30/3312 716/119 |
| 2009/0224356 | A1* | 9/2009 | Chandra | G06F 30/23 716/113 |
| 2009/0319964 | A1* | 12/2009 | Kariat | G06F 30/367 716/136 |
| 2011/0320995 | A1 | 12/2011 | Osaka | |
| 2012/0079438 | A1* | 3/2012 | Paciaroni | G06F 30/367 716/103 |
| 2012/0119767 | A1* | 5/2012 | Su | G01R 31/2817 324/750.03 |
| 2015/0168962 | A1* | 6/2015 | Waldmann | G05B 19/418 700/121 |
| 2016/0109148 | A1* | 4/2016 | Honda | G01J 5/025 702/135 |
| 2017/0220720 | A1* | 8/2017 | Kubota | G06F 30/367 |
| 2017/0344683 | A1* | 11/2017 | Kamon | G06F 30/398 |
| 2018/0335483 | A1 | 11/2018 | Takaki | |
| 2020/0011902 | A1* | 1/2020 | Shimizu | G01R 19/0092 |
| 2020/0074022 | A1* | 3/2020 | Okutani | G06F 3/04845 |
| 2020/0158761 | A1* | 5/2020 | Hsu | G01R 15/207 |
| 2021/0262959 | A1* | 8/2021 | Aoki | G01N 27/18 |
| 2022/0171909 | A1* | 6/2022 | Higa | G06F 30/367 |
| 2023/0276600 | A1* | 8/2023 | Salmon | H05K 7/1487 361/679.53 |
| 2024/0169115 | A1* | 5/2024 | Sealy | B33Y 40/00 |

FOREIGN PATENT DOCUMENTS

| | | |
|---|---|---|
| JP | H03237565 A | 10/1991 |
| JP | 2005084895 A | 3/2005 |
| JP | 2016102758 A | 6/2016 |

OTHER PUBLICATIONS

TIP.com translation of JP 2005084489A (Year: 2005).*
Office Action issued for counterpart Japanese Application No. 2020-200192, issued by the Japan Patent Office on Aug. 23, 2022(drafted on Aug. 15, 2022).
Kondo Rei et al., "Signal Noise and Thermal Analysis in the Current Detectopm Circuit of an Air Conditioner Inverter", the Japan Society of Electric Engineers(CD-ROM), Japan Society of Electric Engineers, pp. 239 to 240, Mar. 17, 2017.

* cited by examiner

50

51 OUTPUT FORM INPUT REGION
- ▼ VERTICAL AXIS :
- ▼ HORIZONTAL AXIS :

59

52 CURRENT DETECTION ELEMENT INFORMATION INPUT REGION

FIRST INPUT REGION (53-1)
- ▼ NAME
- ▼ CONDUCTOR RESISTANCE VALUE [ ] m ohm

SECOND INPUT REGION (53-2)
- ▼ SIZE mm
  LENGTH [ ] WIDTH [ ] HEIGHT [ ]
- ▼ RESISTANCE VALUE [ ] m ohm
- ▼ TEMPERATURE COEFFICIENT OF RESISTANCE [ ] ppm/°C

54 SUBSTRATE INFORMATION INPUT REGION
- ▼ NUMBER OF LAYERS [ ] LAYER
- ▼ CONDUCTIVE LAYER THICKNESS [ ] μm
- ▼ CONDUCTIVE LAYER AREA [ ] mm2
- ▼ CONDUCTOR WIDTH [ ] mm
- ▼ CONDUCTOR LENGTH [ ] mm

55 ENVIRONMENT INFORMATION INPUT REGION
- ▼ ENVIRONMENT TEMPERATURE [ ] °C
- ▼ EFFECTIVE CURRENT [ ] A
- ▼ TEMPERATURE RISE [ ] °C
- ▼ CONVECTION HEAT TRANSFER COEFFICIENT [ ]
- ▼ SUBSTRATE SURFACE STATE
- ▼ RADIATION HEAT TRANSFER COEFFICIENT [ ]
- ▼ SUBSTRATE ARRANGEMENT DIRECTION

| Analysis Condition Ia Number | Element Type | Resistance Value | Size x | Size y | Size z | Temperature Coefficient of Resistance | Number of Conductive Layers 44 | Thickness of Conductive Layers 44 | Environment Temperature | Effective Current Im | Convection Heat Transfer Coefficient | Radiation Heat Transfer Coefficient | Surface State of Substrate 42 | Temperature of Surrounding Parts | Arrangement Direction of Substrate 42 |
|---|---|---|---|---|---|---|---|---|---|---|---|---|---|---|---|
| | | | | | | | Substrate Information Is | | | | Environment Information Ie | | | | |
| 1 | Magnetic Sensor | 0.27 | - | - | - | - | 4 | 70 | 85°C | 60 | - | - | PCB Substrate | - | Horizontal |
| 2 | Magnetic Sensor | 1.6 | - | - | - | - | 4 | 70 | 85°C | 60 | - | - | PCB Substrate | - | Horizontal |
| 3 | Shunt | 3 | 20 | 20 | 50 | 0.1 | 4 | 70 | 85°C | 60 | - | - | PCB Substrate | - | Horizontal |
| 4 | Shunt | 2 | 20 | 20 | 30 | 0.1 | 4 | 70 | 85°C | 60 | - | - | PCB Substrate | - | Horizontal |
| 5 | Shunt | 1 | 10 | 20 | 20 | 0.1 | 4 | 70 | 85°C | 60 | - | - | PCB Substrate | - | Horizontal |
| 6 | Shunt | 1 | 10 | 20 | 20 | 0.1 | 4 | 70 | 85°C | 60 | - | - | PCB Substrate | - | Vertical |

MAGNETIC SENSOR : CURRENT DETECTION ELEMENT 43 (FIG. 1)
SHUNT : CURRENT DETECTION ELEMENT 143 (FIG. 3)

ASSIST APPARATUS, DESIGN ASSIST METHOD, DESIGN ASSIST SYSTEM, AND COMPUTER READABLE MEDIUM

The contents of the following Japanese patent application is incorporated herein by reference:
NO. 2020-200192 filed in JP on Dec. 2, 2020.

BACKGROUND

1. Technical Field

The present invention relates to a design assist apparatus, a design assist method, a design assist system, and a computer readable medium.

2. Related Art

Patent document 1 describes "heating elements are arranged on a substrate on an arrangement screen, and a temperature distribution on the substrate is calculated according to arrangement positions to display the temperature distribution, so that a thermal investigation can be easily performed".

CITATION LIST

Patent Document

[Patent document 1] Japanese Unexamined Patent Application, Publication No. 2005-84895

BRIEF DESCRIPTION OF THE DRAWINGS

FIG. 6 is an enlarged view of an output form input region 51 and an analysis condition input region 59 in FIG. 5.

FIG. 13 illustrates one example of an analysis condition display region 66 illustrated in FIG. 12.

DESCRIPTION OF EXEMPLARY EMBODIMENTS

Hereinafter, the present invention will be described by way of embodiments of the invention, but the following embodiments are not intended to restrict the invention according to the claims. In addition, not all combinations of features described in the embodiments necessarily have to be essential to solving means of the invention.

Figure 1:
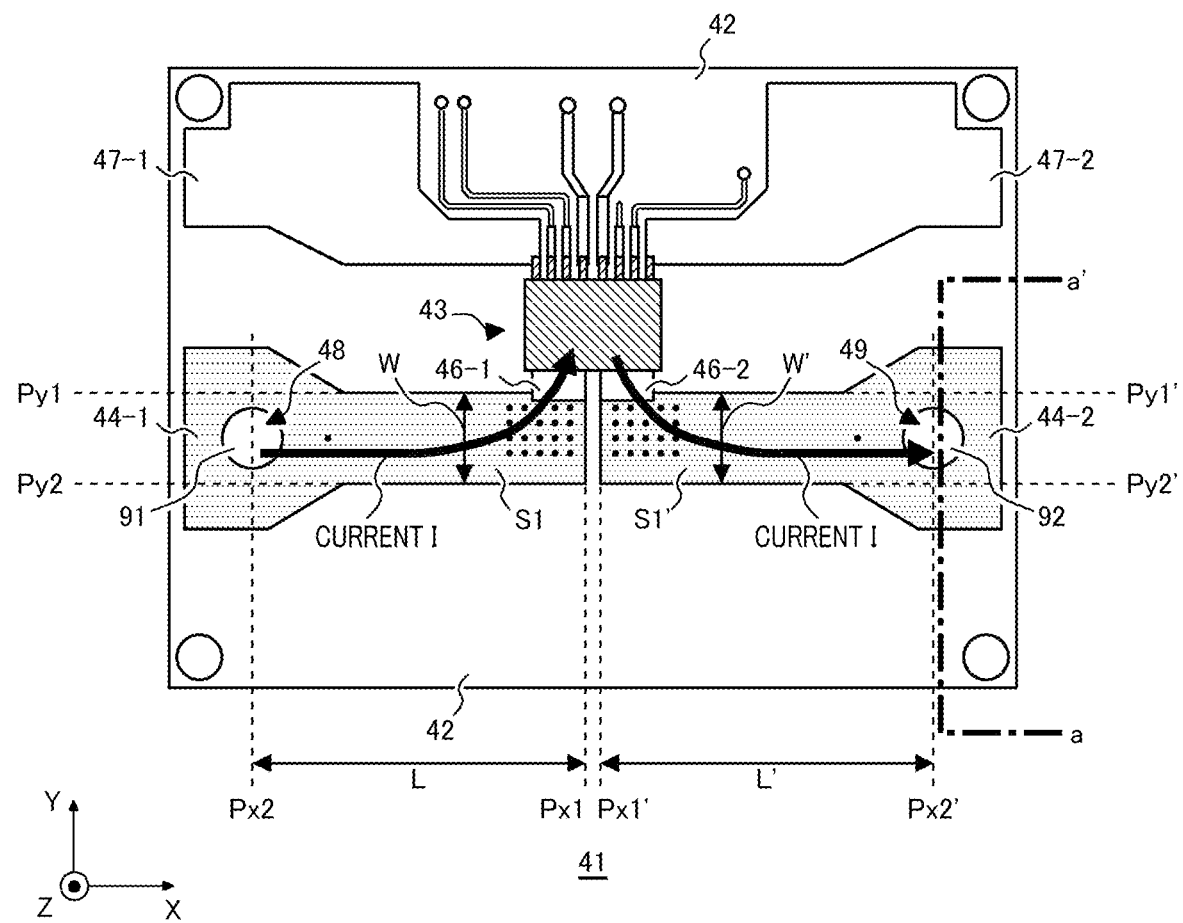
FIG. 1 illustrates one example of a thermal analysis target 41 according to one embodiment of the present invention.

FIG. 1 illustrates one example of a thermal analysis target 41 according to one embodiment of the present invention. The thermal analysis target 41 is, for example, a printed substrate used for electronic equipment or the like. The thermal analysis target 41 includes a substrate 42 and a current detection element 43. The substrate 42 has a conductive layer 44. The substrate 42 may have a conductive layer 47. The conductive layer 44 and the conductive layer 47 are, for example, copper foils.

In the present specification, a technical matter may be described using orthogonal coordinate axes of an X axis, a Y axis, and a Z axis. In the present specification, a plane parallel to the substrate 42 is defined as an XY plane. In the present specification, a direction orthogonal to the plane of the substrate 42 (thickness direction of the substrate 42) is defined as a Z axis direction. In the present specification, a predetermined direction in the XY plane is defined as an X axis direction, and a direction orthogonal to the X axis in the XY plane is defined as a Y axis direction.

In the present specification, the X axis direction refers to a direction from one side to the other side in a direction parallel to the X axis and a direction from the other side to the one side. That is, in the present specification, the X axis direction does not refer to any one of the two directions parallel to the X axis, but refers to the directions parallel to the X axis. In the present specification, the same also applies to the Y axis direction and the Z axis direction.

In the present specification, a plan view refers to a case where the substrate 42 is viewed from the Z axis direction. In the present specification, a side view refers to a case where the substrate 42 is viewed from a direction perpendicular to the Z axis (the predetermined direction in the XY plane).

When a current I flowing in the conductive layer 44 is measured, the current detection element 43 is a device configured to detect the current I. The current detection element 43 may be a current sensor of a magnetic field detection type. The current sensor of the magnetic field detection type refers to a magnetic sensor configured to sense a magnetic field generated by the current I. The current detection element 43 is, for example, a Hall element. In FIG. 1, a direction of the current I is illustrated by a bold arrow.

When the current detection element 43 is a magnetic sensor, an IC (integrated circuit) configured to amplify a signal from the magnetic sensor may be provided in the current detection element 43. The substrate 42 may have two conductive layers 47 (a conductive layer 47-1 and a conductive layer 47-2). A current flowing in the IC may flow in the conductive layer 47.

The current detection element 43 may have a connection terminal 46. In the present example, the current detection element 43 has two connection terminals 46 (a connection terminal 46-1 and a connection terminal 46-2). The substrate 42 of the present example has two conductive layers 44 (a conductive layer 44-1 and a conductive layer 44-2) in a plan view. The connection terminal 46-1 may be connected to the conductive layer 44-1. The connection terminal 46-2 may be connected to the conductive layer 44-2.

The substrate 42 generates heat when the current I flows in the conductive layer 44. When the current I flows in the conductive layer 44, the current detection element 43 generates heat. A thermal analysis unit 40 (described below) is configured to thermally analyze heat generation of the substrate 42 and the current detection element 43.

An opening 48 may be provided in the substrate 42 and the conductive layer 44-1. An opening 49 may be provided in the substrate 42 and the conductive layer 44-2. A via 91 may be provided in the opening 48. A via 92 may be provided in the opening 49.

The substrate 42 may have one or a plurality of the conductive layers 44. The plurality of conductive layers 44 may be provided in a thickness direction of the substrate 42. The via 91 may electrically connect one conductive layer 44-1 to another conductive layer 44-1. The via 92 may electrically connect one conductive layer 44-2 to another conductive layer 44-2.

An end position of the conductive layer 44-1 in the X axis direction which is an end position on the current detection element 43 side is set as a position Px1. A position of the conductive layer 44-1 in the X axis direction which is a center position of the via 91 in a plan view is set as a position Px2. The center position of the via 91 in a plan view refers to a position of a center in a path of the current I flowing in the via 91 in the Z axis direction. A length in the X axis direction from the position Px1 to the position Px2 is set as the length L.

An end position of the conductive layer 44-2 in the X axis direction which is an end position on current detection element 43 side is set as a position Px1'. A position of the conductive layer 44-2 in the X axis direction which is a center position of the via 92 in a plan view is set as a position Px2'. The center position of the via 92 in a plan view refers to a position of a center of a path of the current I flowing in the via 92 in the Z axis direction. A length in the X axis direction from the position Px1' to the position Px2' is set as a length L'.

One end position of the conductive layers 44-1 in the Y axis direction which is an end position on the current detection element 43 side is set as a position Py1. Another end position of the conductive layers 44-1 in the Y axis direction is set as a position Py2. A width in the Y axis direction from the position Py1 to the position Py2 is set as a width W.

One end position of the conductive layers 44-2 in the Y axis direction which is an end position on the current detection element 43 side is set as a position Py1'. Another end position of the conductive layers 44-2 in the Y axis direction is set as a position Py2'. A width in the Y axis direction from the position Py1' to the position Py2' is set as a width W'.

Note that in the Y axis direction, the position Py1 and the position Py1' may be the same position, or may also be different positions. In the Y axis direction, the position Py2 and the position Py2' may be the same position, or may also be different positions. The width W and the width W' may be equal to each other or may also be different from each other. In the present example, in the Y axis direction, the position Py1 and the position Py1' are the same position, and the position Py2 and the position Py2' are the same position. In the present example, the width W and the width W' are equal to each other.

When the length L changes from the position Py1 to the position Py2 along the Y axis direction, the length L may be an average value of the length from the position Px1 to the position Px2 between the position Py1 and the position Py2, may also be a maximum value, may also be a minimum value, or may also be a median. The same also applies to the length L'.

When the width W changes from the position Px1 to the position Px2 along the X axis direction, the width W may be an average value of the width from the position Py1 to the position Py2 between the position Px1 and the position Px2, may also be a maximum value, may also be a minimum value, or may also be a median. The same also applies to the width W'.

An area in a plan view of the conductive layer 44-1 is set as an area S1. An area in a plan view of the conductive layer 44-2 is set as an area S1'. In FIG. 1, a range of each of the area S1 and the area S1' is hatched.

The current detection element 43 tends to generate heat in accordance with detection of the current I. Since the heat of the current detection element 43 propagates to the conductive layer 44, the heat tends to propagate in a plane direction of the substrate 42 (in the XY plane). As the area S1 and the area S1' are larger, the heat of the current detection element 43 more easily diffuses in the plane direction of the substrate 42. The area S1 and the area S1' are heat dissipation areas of the heat generated by the current detection element 43.

The area S1 and the area S1' may be equal to each other or may also be different from each other. In the present example, the area S1 and the area S1' are equal to each other.

Figure 2:
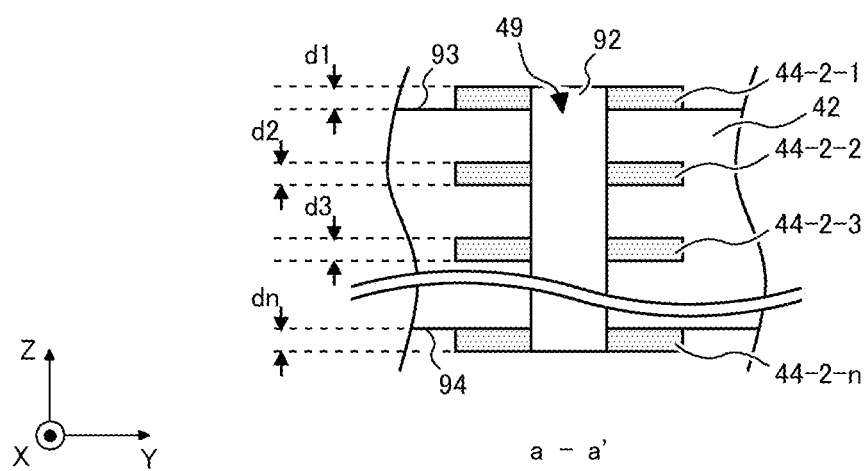
FIG. 2 illustrates one example of a cross section of a substrate 42 through an a-a' line in FIG. 1.

FIG. 2 illustrates one example of a cross section of the substrate 42 through an a-a' line in FIG. 1. The a-a' line is a YZ cross section through the substrate 42, the conductive layer 44-2, the opening 49, and the via 92. The substrate 42 may have n layers of conductive layers 44-2 (a conductive layer 44-2-1 to a conductive layer 44-2-n). Where n is an integer higher than or equal to 2. Here, n is the number of the conductive layers 44-2.

In the present specification, the conductive layer 44-2-1 side in the Z axis direction is referred to as an upper side, and the conductive layer 44-2-n side is referred to as a lower side. The conductive layer 44-2-1 may be provided at an upper surface 93 of the substrate 42. The conductive layer 44-2-n may be provided at a lower surface 94 of the substrate 42. The opening 49 may penetrate the substrate 42 from the upper surface 93 through the lower surface 94. The via 92 may electrically connect the conductive layer 44-2-1 to the conductive layer 44-2-n to each other.

Thicknesses of the conductive layer 44-2-1 to the conductive layer 44-2-n are respectively set as a thickness d1 to a thickness dn. The thickness d1 to the thickness dn may be all equal to each other, or may also be all different from each other. In the present example, the thickness d1 to the thickness dn are all equal to each other. In the present example, the thickness of each of the conductive layer 44-2-1 to the conductive layer 44-2-n is set as the thickness d.

The substrate 42 may have n layers of conductive layers 44-1 similarly as in the conductive layers 44-2. A conductive layer 44-1-1 may be provided at the upper surface 93 of the substrate 42. A conductive layer 44-1-n may be provided at the lower surface 94 of the substrate 42. The opening 48 may penetrate the substrate 42 from the upper surface 93 through the lower surface 94. The via 91 may electrically connect the conductive layer 44-1-1 to the conductive layer 44-1-$n$ to each other.

Thicknesses of the conductive layer 44-1-1 to the conductive layer 44-1-$n$ may be respectively set as the thickness d1 to the thickness dn similarly as in the thicknesses of the conductive layer 44-2-1 to the conductive layer 44-2-$n$. In the present example, the thickness of each of the conductive layer 44-1-1 to the conductive layer 44-1-$n$ is the thickness d similarly as in the conductive layer 44-2-1 to the conductive layer 44-2-$n$.

In a plan view of the substrate 42, shapes of the plurality of conductive layers 44-2 may be the same. In the example illustrated in FIG. 2, the shapes in a plan view of the conductive layer 44-2-2 to the conductive layer 44-2-$n$ may be the same as the shape in a plan view of the conductive layer 44-2-1. The shapes of the plurality of conductive layers 44-2 may be different from each other in a plan view of the substrate 42.

Figure 3:
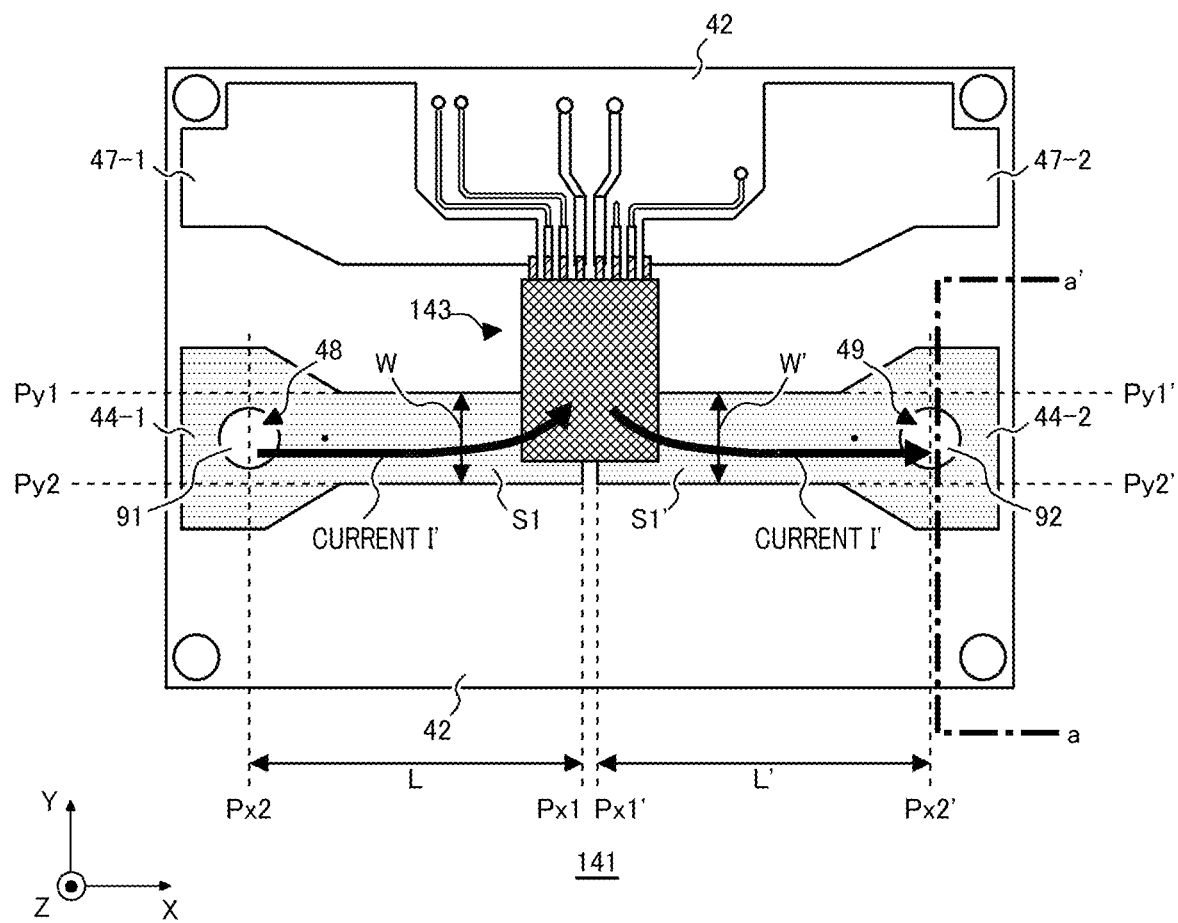
FIG. 3 illustrates a thermal analysis target 141 according to one embodiment of the present invention.

FIG. 3 illustrates a thermal analysis target 141 according to one embodiment of the present invention. The thermal analysis target 141 includes a current detection element 143. The current detection element 143 may be a current sensor of a current-to-voltage conversion type. The current sensor of the current-to-voltage conversion type refers to a current sensor configured to sense a current by converting a current flowing in a resistor into a voltage. The current detection element 143 is, for example, a shunt resistor. The thermal analysis target 141 is different from the thermal analysis target 41 in this regard (see FIG. 1). The current detection element 143 is electrically connected to the conductive layer 44-1, and electrically connected to the conductive layer 44-2.

Since the current sensor of the current-to-voltage conversion type is configured to sense the current by converting the current flowing in the resistor into the voltage, a resistance value of the resistor preferably has such a magnitude that the converted voltage can be detected. For this reason, a heating value per unit time in the current sensor of the current-to-voltage conversion type tends to be higher than a heating value per unit time in a current sensor of a magnetic detection type. The thermal analysis target 141 may be a thermal analysis target of a comparison target with the thermal analysis target 41.

Figure 4:
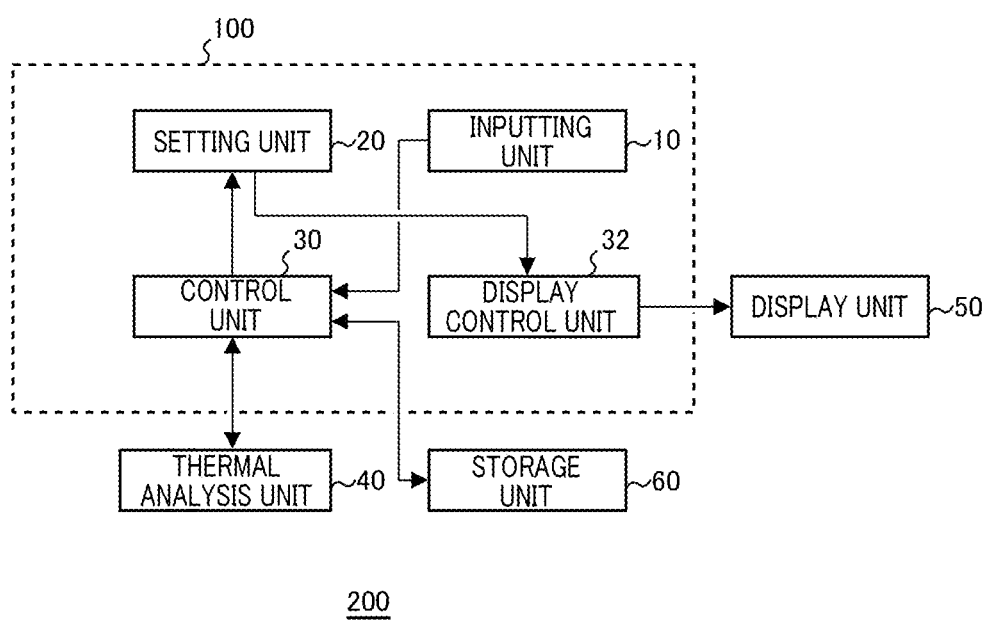
FIG. 4 illustrates one example of a design assist system 200 according to one embodiment of the present invention.

FIG. 4 illustrates one example of a design assist system 200 according to one embodiment of the present invention. The design assist system 200 includes a design assist apparatus 100, the thermal analysis unit 40, display unit 50, and a storage unit 60. The thermal analysis unit 40 is a unit configured to thermally analyze the thermal analysis target 41 (see FIG. 1). The display unit 50 is, for example, a display, a monitor, or the like. The storage unit 60 is, for example, a storage device such as a hard disk drive. The storage unit 60 stores at least one of substrate information (described below) that is information of the substrate 42, current detection element information that is information of the current detection element 43, and a thermal analysis result of the thermal analysis target 41 by the thermal analysis unit 40. The storage unit 60 may store product information of the current detection element 43.

Note that the design assist system 200 does not necessarily need to include the storage unit 60. When the design assist system 200 does not include the storage unit 60, the storage unit 60 separate from the design assist system 200 may be connected to the design assist system 200.

The design assist apparatus 100 includes an inputting unit 10, a setting unit 20, a control unit 30, and a display control unit 32. The inputting unit 10 is, for example, a mouse, a keyboard, or the like. The control unit 30 is, for example, a central processing unit (CPU). The design assist apparatus 100 is, for example, a computer including the CPU, a memory, an interface, and the like.

The inputting unit 10 is configured to input an analysis condition of the thermal analysis target 41 (see FIG. 1). The analysis condition is set as an analysis condition Ia. The analysis condition Ia includes the substrate information (described below) that is information related to the substrate 42, and the current detection element information (described below) that is the information of the current detection element 43. The thermal analysis target 41 is thermally analyzed by the thermal analysis unit 40 based on the analysis condition Ia. The setting unit 20 is configured to set an output form of the thermal analysis result of the thermal analysis target 41. The output form will be described below.

The display control unit 32 is configured to control the display unit 50. The display control unit 32 is, for example, a graphics processing unit (GPU). The display control unit 32 is configured to control the display unit 50 to display the thermal analysis result of the thermal analysis target 41 (see FIG. 1) on the display unit 50 in the output form set by the setting unit 20.

Note that the display control unit 32 may be included in the control unit 30. The control unit 30 and the display control unit 32 may be, for example, one CPU.

Figure 5:
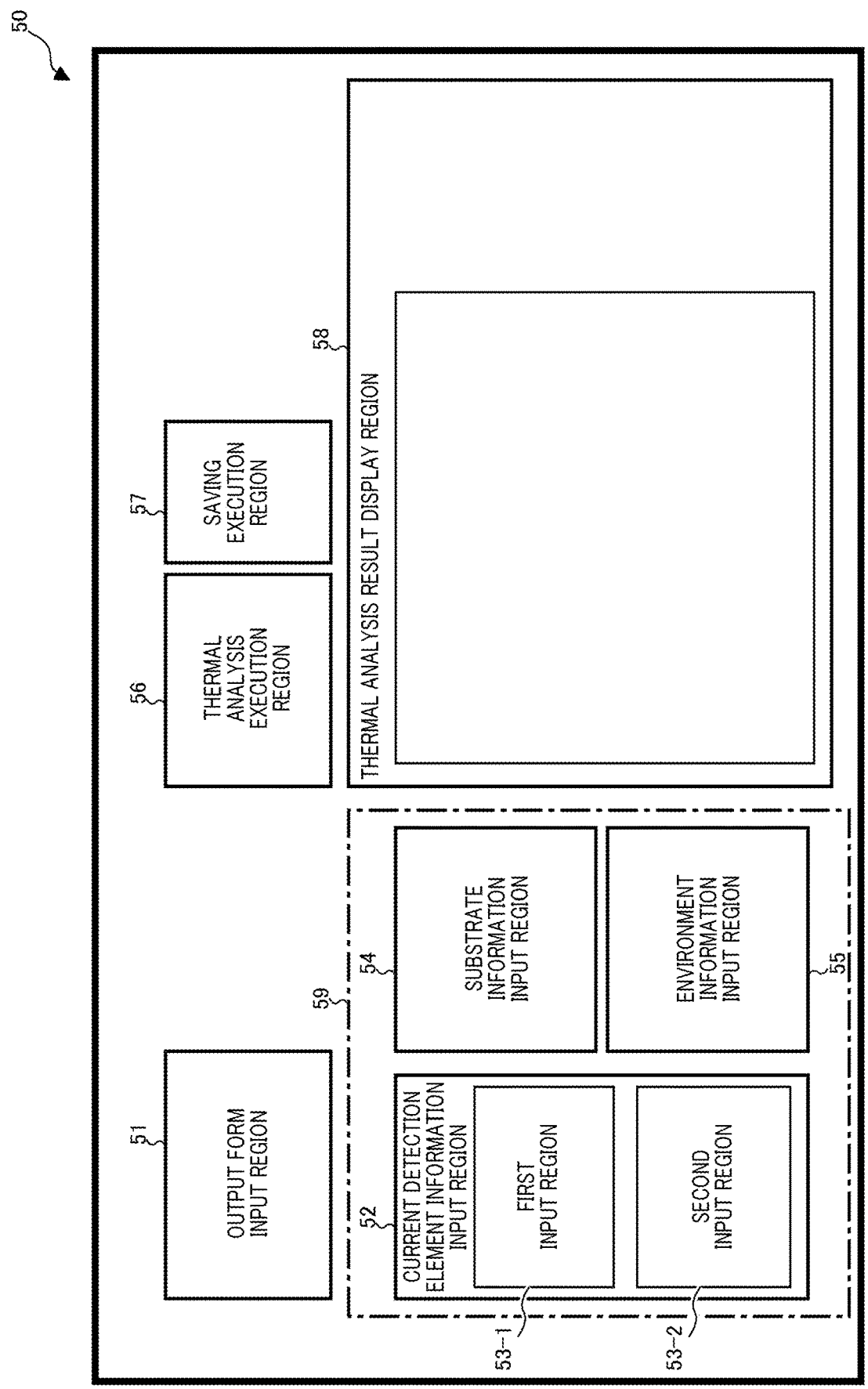
FIG. 5 illustrates one example of a display manner for display on a display unit 50.

FIG. 5 illustrates one example of a display manner for display on the display unit 50. The display control unit 32 (see FIG. 4) may control the display unit 50 to display an output form input region 51, an analysis condition input region 59, a current detection element information input region 52, a substrate information input region 54, an environment information input region 55, a thermal analysis execution region 56, a saving execution region 57, and a thermal analysis result display region 58 on the display unit 50.

The thermal analysis result display region 58 is a region for displaying a result obtained by thermally analyzing at least one of the thermal analysis target 41 and the thermal analysis target 141 by the thermal analysis unit 40 (see FIG. 4) based on the analysis condition Ia (described below). The result is set as a thermal analysis result Ir. In the thermal analysis result display region 58, the thermal analysis result Ir may be displayed in a graph form, or may also be displayed in a tabular form.

The output form input region 51 is a region for inputting the output form of the thermal analysis result Ir. The output form may be input by the inputting unit 10 (see FIG. 4). The output form refers to a display form of the thermal analysis result Ir displayed in the thermal analysis result display region 58 (described below). As will be described below, the display form may be a graph form or a tabular form. When the display form is a graph form, the output form input region 51 may be a region for inputting two parameters in the graph form.

The analysis condition input region 59 is a region for inputting the analysis condition Ia. In the present example, the analysis condition input region 59 includes the current detection element information input region 52, the substrate information input region 54, and the environment information input region 55.

The current detection element information input region 52 is a region for inputting the current detection element information. The current detection element information is at least one of information related to the current detection element 43 and information related to the current detection element 143. The current detection element information is set as current detection element information Id. Details of the current detection element information Id will be described below. The current detection element information Id may be input by the inputting unit 10 (see FIG. 4).

In the present example, the current detection element information input region 52 includes two input regions 53. The two input regions 53 are set as a first input region 53-1 and a second input region 53-2. In the present example, the first input region 53-1 is a region for inputting the information related to the current detection element 43. In the present example, the second input region 53-2 is a region for inputting the information related to the current detection element 143.

The substrate information input region 54 is a region for inputting the substrate information. The substrate information is the information related to the substrate 42 (see FIG. 1 and FIG. 3). The substrate information is set as substrate information Is. Details of the substrate information Is will be described below. The substrate information Is may be input by the inputting unit 10 (see FIG. 4).

The environment information input region 55 is a region for inputting environment information. The environment information is at least one of information of an environment where the thermal analysis target 41 is arranged, and information of an environment where the thermal analysis target 141 is arranged. The environment information is set as environment information Ie. The analysis condition Ia may include the environment information Ie. Details of the environment information Ie will be described below. The environment information Ie may be input by the inputting unit 10 (see FIG. 4).

The thermal analysis execution region 56 is a region for inputting start of the thermal analysis. The saving execution region 57 is a region for inputting start of saving of the thermal analysis result. The thermal analysis execution region 56 and the saving execution region 57 will be described below.

FIG. 6 is an enlarged view of the output form input region 51 and the analysis condition input region 59 in FIG. 5. In the present example, the thermal analysis result Ir is displayed in a graph form in the thermal analysis result display region 58 (see FIG. 5). The output form input region 51 of the present example is a region for inputting a vertical axis and a horizontal axis in the graph form. Parameters of the vertical axis and the horizontal axis may be displayed in a pull-down form. Each of the parameters of the vertical axis and the horizontal axis may be one parameter selected from the substrate information Is and the environment information Ie.

The first input region 53-1 is a region for inputting information related to the current detection element 43. The information related to the current detection element 43 is set as first current detection element information Id1. The first current detection element information Id1 may be at least one of a name and a conductor resistance value of the current detection element 43. The name of the current detection element and product information related to the name may be stored in the storage unit 60 (FIG. 4). The name of the current detection element 43 is, for example, a product name of the current detection element 43. When the current detection element 43 is a magnetic sensor, a magnetic field by the current is applied to the magnetic sensor. The conductor resistance value of the current detection element 43 may be a resistance value of a conductor for the current to flow. Note that when the name of the current detection element 43 is input in the first input region 53-1, an input of the conductor resistance value of the current detection element 43 may be disabled.

The second input region 53-2 is a region for inputting the information related to the current detection element 143. The information related to the current detection element 143 is set as second current detection element information Id2. The current detection element information Id2 may include a temperature coefficient of resistance of the current detection element 143. The current detection element information Id2 may further include at least one of a size and a resistance value of the current detection element 143. In the present example, the current detection element information Id2 includes the size, the resistance value, and the temperature coefficient of resistance of the current detection element 143. When the current detection element 143 is a shunt resistor, the current detection element information Id2 is a size [mm], a resistance value [m ohm], and a temperature coefficient of resistance [ppm/° C.] of the shunt resistor.

The substrate information input region 54 is a region for inputting the substrate information Is. The substrate information Is may include at least one of the number of the conductive layers 44 (see FIG. 2), the thickness d of the conductive layers 44 (see FIG. 2) [μm], and the area [mm$^2$] of the conductive layers 44. The area of the conductive layers 44 is set as a conductive layer area S. The conductive layer area S is a heat dissipation area of the conductive layers 44. In the present example, the conductive layer area S is a sum of the area S1 and the area S1' (see FIG. 1 and FIG. 3).

The substrate information Is may include a conductor width. The conductor width is the width W and the width W' of the conductive layers 44 (see FIG. 1 and FIG. 3). The substrate information Is may include a conductor length. The conductor length may be a sum of the length L and the length L' of the conductive layers 44 (see FIG. 1 and FIG. 3). Note that when the conductive layer area S is input in the substrate information input region 54, inputs of the conductor width and the conductor length may be disabled.

The environment information input region 55 is a region for inputting the environment information Ie. The environment information Ie may include at least one of a temperature, a convection heat transfer coefficient, and a radiation heat transfer coefficient of an environment where at least one of the thermal analysis target 41 and the thermal analysis target 141 is arranged.

The temperature of the environment where the thermal analysis target 41 is arranged may be a temperature of a location where the current detection element 43 is arranged above the substrate 42 in the thermal analysis target 41. The temperature of the environment where the thermal analysis target 141 is arranged may be a temperature of a location where the current detection element 143 is arranged above the substrate 42 in the thermal analysis target 141. The temperature of the location where the current detection element 43 is arranged and the temperature of the location where the current detection element 143 is arranged may reach 100° C.

The convection heat transfer coefficient of the environment where the thermal analysis target 41 is arranged is a coefficient representing a degree of propagation of energy by a flow of air, water, or the like in the environment. When the thermal analysis target 41 is exposed to wind by a wind cooling fan, for example, the convection heat transfer coefficient is higher as compared with a case where the thermal analysis target 41 is not exposed to the wind.

The radiation heat transfer coefficient of the environment where the thermal analysis target 41 is arranged is a coefficient representing a degree of radiation of energy of electromagnetic waves emitted from an object. In the present example, the object is the substrate 42, the current detection element 43, or the like. The radiation heat transfer coefficient may be negligible when the temperature is lower than a predetermined temperature. The predetermined temperature is, for example, 90° C. However, a temperature of the substrate 42, the current detection element 43, or the like may reach 100° C. or higher. For this reason, by taking into account the radiation heat transfer coefficient of the electromagnetic waves emitted from the substrate 42, the current detection element 43, or the like, the thermal analysis unit 40 can more accurately calculate a temperature rise $T_{rise}$ (described below) in the environment where the thermal analysis target 41 is arranged as compared with a case where the radiation heat transfer coefficient is not taken into account.

The environment information Ie may further include at least one of a surface state of the substrate 42 and an arrangement direction of the substrate 42. The surface state of the substrate 42 refers to, for example, information related to heat dissipation of the substrate 42 such as whether the conductive layer 44 arranged at the upper surface 93 of the substrate 42 is in an exposed state, or whether the substrate 42 is in a state of being applied with solder resist. The arrangement direction of the substrate 42 refers to information related to an arrangement of the substrate 42 such as whether the upper surface 93 (see FIG. 2) of the substrate 42 is parallel to a horizontal direction or parallel with a vertical direction. Due to the heat dissipation from the substrate 42, convection is likely to be generated in the air in the surrounding of the substrate 42. When the upper surface 93 is parallel to the vertical direction instead of being parallel to the horizontal direction, the convection air and the upper surface 93 are more likely to intersect with each other. For this reason, when the upper surface 93 is parallel to the vertical direction instead of being parallel to the horizontal direction, the substrate 42 is more likely to be cooled.

The environment information Ie may further include at least one of an effective current and a temperature rise. The effective current is an effective value of the current I flowing in the conductive layer 44. The effective value of the current I flowing in the conductive layer 44 may be a maximum value of the current I that may flow in the conductive layer 44. The temperature rise is a difference between a maximum value of a temperature allowed in the environment where the thermal analysis target 41 and the thermal analysis target 141 are arranged and a current temperature. The temperature rise is set as the temperature rise $T_{rise}$.

Figure 7:
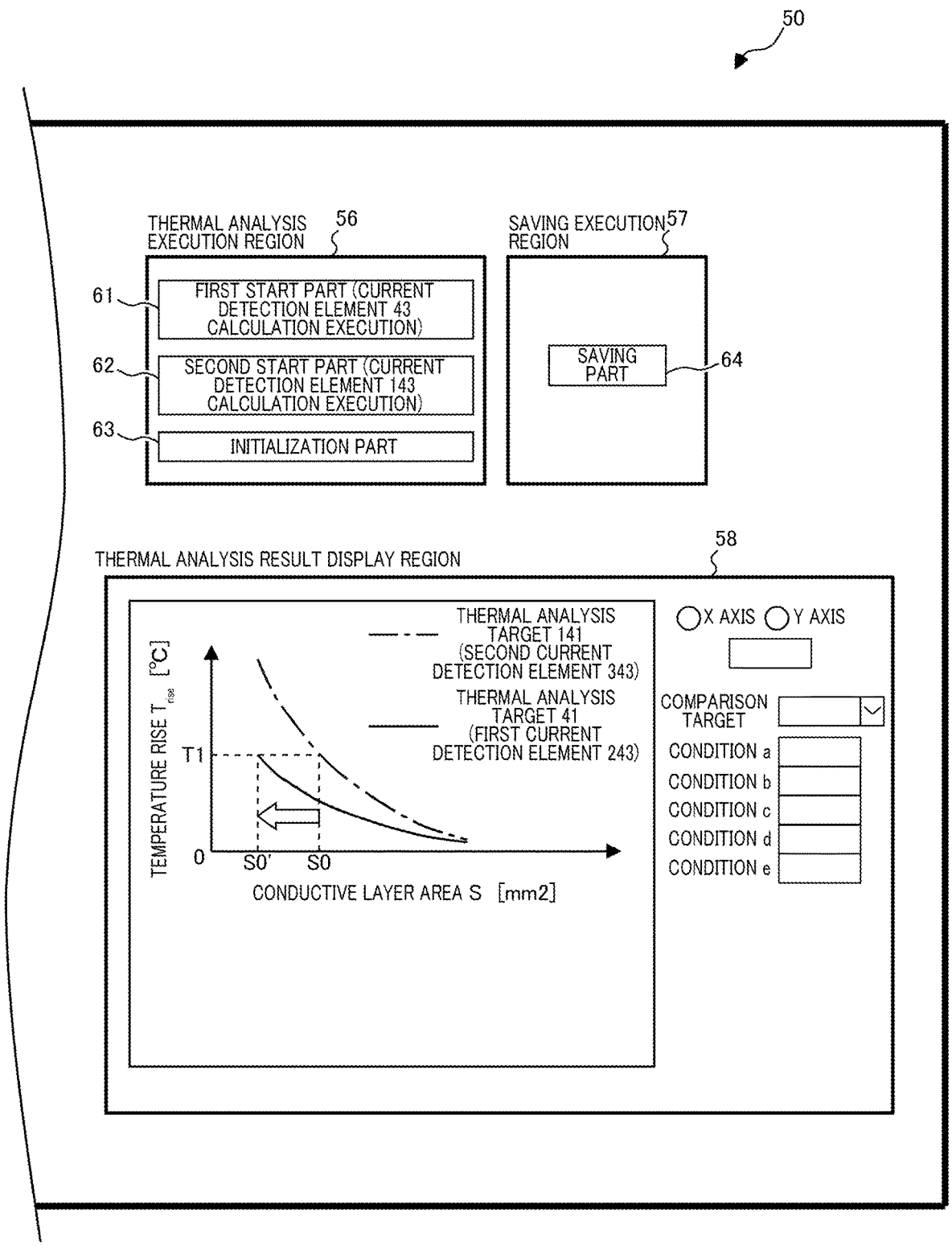
FIG. 7 is an enlarged view of a thermal analysis execution region 56, a saving execution region 57, and a thermal analysis result display region 58 in FIG. 5.

FIG. 7 is an enlarged view of the thermal analysis execution region 56, the saving execution region 57, and the thermal analysis result display region 58 in FIG. 5. In the present example, the current detection element 43 is set as a first current detection element 243, and the current detection element 143 is set as a second current detection element 343. The second current detection element 343 may be a current detection element of a different type from the first current detection element 243. A different type of the current detection element may refer to a different method of detecting a current. In the present example, the first current detection element 243 is a magnetic sensor, and the second current detection element 343 is a shunt resistor. The magnetic sensor is configured to detect a current by detecting a magnetic field by the current. The shunt resistor is configured to detect a current by detecting a voltage generated when a current flows in a conductor. In the present example, the first current detection element 243 and the second current detection element 343 have different current detection methods in this regard.

The display control unit 32 (see FIG. 4) may control the display unit 50 to display a first start part 61 for starting the thermal analysis of the thermal analysis target 41 including the first current detection element 243 and a second start part 62 for starting the thermal analysis of the thermal analysis target 141 including the second current detection element 343 on the display unit 50. In the present example, the display control unit 32 is configured to control the display unit 50 to display the first start part 61 and the second start part 62 in the thermal analysis execution region 56. The first start part 61 and the second start part 62 may be buttons to be displayed on the display unit 50.

The current detection element information Id related to the first current detection element 243 is set as the first current detection element information Id1. The current detection element information Id related to the second current detection element 343 is set as the second current detection element information Id2. When the inputting unit 10 (see FIG. 4) inputs start of the thermal analysis of the thermal analysis target 41 including the first current detection element 243, the thermal analysis unit 40 (see FIG. 4) may thermally analyze the thermal analysis target 41 based on a first analysis condition Ia1 including the first current detection element information Id1. When the inputting unit 10 inputs start of the thermal analysis of the thermal analysis target 41 including the second current detection element 343, the thermal analysis unit 40 may thermally analyze the thermal analysis target 41 based on a second analysis condition Ia2 including the second current detection element information Id2. In the present example, when the inputting unit 10 presses the first start part 61, the thermal analysis unit 40 thermally analyzes the thermal analysis target 41 based on the analysis condition Ia including the first current detection element information Id1. In the present example, when the inputting unit 10 presses the second start part 62, the thermal analysis unit 40 thermally analyzes the thermal analysis target 41 based on the analysis condition Ia including the second current detection element information Id2.

The display control unit 32 (see FIG. 4) may control the display unit to display an initialization part 63 on the display unit 50. In the present example, the display control unit 32 controls the display unit 50 to display the initialization part 63 in the thermal analysis execution region 56. The initialization part 63 may be a button to be displayed on the display unit 50. When the inputting unit 10 presses the initialization part 63, the display control unit 32 may control the display unit 50 to delete the thermal analysis result Ir displayed on the display unit 50 from the display unit 50.

The saving execution region 57 may include a saving part 64 to be displayed on the display unit. The saving part 64 may be a button to be displayed on the display unit 50. When the inputting unit 10 presses the saving part 64, the thermal analysis result Ir may be stored in the storage unit 60 (see FIG. 4).

The thermal analysis result display region 58 is a region for displaying the thermal analysis result Ir of at least one of the thermal analysis target 41 and the thermal analysis target 141. The inputting unit 10 (see FIG. 4) may input first information If1 and second information If2 which are selected from among the substrate information Is, the current detection element information Id, and the environment information Ie. The first information If1 and the second information If2 are different from each other. The first information If1 and the second information If2 may be selected from items displayed in the current detection element information input region 52, the substrate information input region 54, and the environment information input region 55 which are illustrated in FIG. 6. The first information If1 and the second information If2 may be input in the output form input region 51. The first information If1 may be one parameter of the vertical axis and the horizontal axis which is input in the output form input region 51. The second information If2 may be the other parameter of the vertical axis and the horizontal axis which is input in the output form input region 51.

The setting unit 20 may set the output form of the thermal analysis result Ir as a form representing a relationship between the first information If1 and the second information If2. In the present example, the setting unit 20 sets the output form of the thermal analysis result Ir as a graph form. In the present example, the first information If1 is the conductive layer area S, and the second information If2 is the temperature rise $T_{rise}$.

The analysis condition Ia of the thermal analysis target 41 is set as the first analysis condition Ia1. The analysis condition Ia obtained by changing at least one of the substrate information Is and the current detection element information Id from the first analysis condition Ia1 is set as the second analysis condition Ia2. In the present example, the analysis condition Ia obtained by changing the current detection element information Id from the first analysis condition Ia1 is set as the second analysis condition Ia2. In the present example, the second analysis condition Ia2 is the analysis condition Ia of the thermal analysis target 141.

A first thermal analysis result based on the first analysis condition Ia1 is set as a first thermal analysis result Ir1. A second thermal analysis result based on the second analysis condition Ia2 is set as a second thermal analysis result Ir2. The display control unit 32 is configured to control the display unit 50 to display, on the display unit 50 in the output form set by the setting unit 20, the first thermal analysis result Ir1 and the second thermal analysis result Ir2. The display control unit 32 (see FIG. 4) is configured to control the display unit 50 to display, on the display unit 50 and in a mutually identifiable manner, the first thermal analysis result Ir1 and the second thermal analysis result Ir2. In the present example, the first thermal analysis result Ir1 of the thermal analysis target 41 is illustrated by a solid line, and the second thermal analysis result Ir2 of the thermal analysis target 141 is illustrated by a one dot chain line, so that the first thermal analysis result Ir1 and the second thermal analysis result Ir2 are displayed on the display unit 50 in a mutually identifiable manner.

The substrate information Is in the first analysis condition Ia1 is set as substrate information Is1. The substrate information Is in the second analysis condition Ia2 is set as substrate information Is2. The substrate information Is1 and the substrate information Is2 may be the same. The environment information Ie in the first analysis condition Ia1 is set as environment information Ie1. The environment information Ie in the second analysis condition Ia2 is set as environment information Ie2. The environment information Ie1 and the environment information Ie2 may be the same.

When the current detection element 43 is a magnetic sensor and also the magnetic sensor senses a change of the magnetic field, a current due to the change of the magnetic field is generated in the magnetic sensor. A primary conductor of the current detection element 43 refers to a conductor where the current generated by the change of the magnetic field flows.

In the present example, since a resistance value of the primary conductor of the current detection element 43 is lower than the resistance value of the current detection element 143, the heating value per unit time of the thermal analysis target 41 including the current detection element 43 is more likely to be suppressed than the heating value per unit time of the thermal analysis target 141 including the current detection element 143. When the substrate information Is1 and the substrate information Is2 are the same and also the environment information Te1 and the environment information Ie2 are the same, a user of the design assist apparatus 100 can easily understand differences of heat dissipation characteristics of the substrate 42 in a case where the current detection element 143 and the current detection element 43 are swapped. In the example illustrated in FIG. 7, in a case where the current detection element 143 is replaced with the current detection element 43, the user of the design assist apparatus 100 can easily understand a reduction effect of the conductive layer area S when the temperature rise $T_{rise}$ for both is set as T1.

In the thermal analysis target 41, a heat quantity generated when the current flows in the conductive layer 44 and the current detection element 43 is set as the heat quantity Qt1. In the thermal analysis target 41, a convection heat quantity above the conductive layer 44 and above the current detection element 43 is set as a heat quantity Qc1. In the thermal analysis target 41, a heat quantity due to heat radiation by the conductive layer 44 and heat radiation by the current detection element 43 is a heat quantity Qr1. The following relationship is established among the heat quantity Qt1, the heat quantity Qc1, and the heat quantity Qr1.

$$Qt1 - Qc1 - Qr1 = 0 \qquad (1)$$

In the thermal analysis target 141, a heat quantity generated when the current flows in the conductive layer 44 and the current detection element 143 is set as the heat quantity Qt2. In the thermal analysis target 141, a convection heat quantity above the conductive layer 44 and above the current detection element 143 is set as a heat quantity Qc2. In the thermal analysis target 141, a heat quantity due to heat radiation by the conductive layer 44 and heat radiation by the current detection element 143 is a heat quantity Qr2. A relationship similar to the Expression 1 described above is established among the heat quantity Qt2, the heat quantity Qc2, and the heat quantity Qr2.

A current flowing in the conductive layer 44 and the current detection element 43 is set as I1, and a resistance value of the current detection element 43 is set as $R1_p$. A resistance value of the conductive layer 44 is set as $R_{sub}$, and a temperature coefficient of resistance of the conductive layer 44 is set as $\alpha$. A temperature of the substrate 42 is set as t. The number of the conductive layers 44 (see FIG. 2) is set as n, and an average thickness of the n conductive layers 44 is set as d. A resistivity of the conductive layer 44 in a case where a temperature of the conductive layer 44 is 0° C. is set as $\rho_0$, and a resistivity of the conductive layer 44 in a case where the temperature of the conductive layer 44 is t is set as $\rho$. The heat quantity Qt1 is represented by the following expression.

$$Qt1 = I1^2(R_{sub} + R1_p) \qquad (2\text{-}1)$$

$$R_{sub} = \left(\frac{\rho L}{dnW} + \frac{\rho L'}{dnW'}\right) \quad (2\text{-}2)$$

$$\rho = \rho_0(1 + \alpha t) \quad (2\text{-}3)$$

Where L is the length in the X axis direction from the position Px1 to the position Px2 (see FIG. 1 and FIG. 3) as described in the description of FIG. 1. L' is the length in the X axis direction from the position Px1' to the position Px2' (see FIG. 1 and FIG. 3). W is the width in the Y axis direction from the position Py1 to the position Py2 (see FIG. 1 and FIG. 3). W' is the width in the Y axis direction from the position Py1' to the position Py2' (see FIG. 1 and FIG. 3).

A current flowing in the conductive layer 44 and the current detection element 143 is set as I2, and a resistance value of the current detection element 143 is set as $R2_p$. A relationship similar to Expressions 2-1 to 2-3 described above is established among the heat quantity Qt2, the current I2, and the resistance value $R2_p$.

An area of a region where the current flows in the conductive layer 44 which is an area of a region above the substrate 42 is set as the area $S_{sub}$. In the thermal analysis target 41, an area in a plan view of the current detection element 43 is set as an area $S1_d$. The area $S1_d$ refers to an area of the hatched region in FIG. 1. A convection heat transfer coefficient due to convection of the heat quantity on the upper surface 93 side of the substrate 42 which is above the conductive layer 44 and above the current detection element 43 and the heat quantity on the lower surface 94 side of the substrate 42 which is below the conductive layer 44 and below the current detection element 43 is set as a convection heat transfer coefficient hc1. A temperature increased due to heat generation by the conductive layer 44 and the current detection element 43 is set as a temperature $T_{rise}1$. The heat quantity Qc1 is represented by the following expression.

$$Qc1 = (S_{sub} + S1_d) \times hc1 \times T_{rise}1 \quad (3\text{-}1)$$

$$S_{sub} = (W \times L + W' \times L') \quad (3\text{-}2)$$

The heat quantity Qr1 is represented by the following expression.

$$Qr1 = (S_{sub} + S1_d) \times hr1 \times T_{rise}1 \quad (4\text{-}1)$$

$$hr1 = \sigma \times t \times (T_{sub}^2 + T_{air}^2) \times (T_{sub} + T_{air}) \quad (4\text{-}2)$$

Where σ denotes a Stephan-Boltzman constant. σ=5.67× $10^{-8}$ [W/(m²·k⁴)]. ε denotes a thermal emissivity from the upper surface and the lower surface of the conductive layer 44 and from the upper surface and the lower surface of the current detection element 43. ε may vary depending on a material of the substrate 42, the surface state of the substrate 42, or the like. ε is a value higher than or equal to 0 and lower than or equal to 1. $T_{sub}$ denotes a temperature of the conductive layer 44 and the current detection element 43. $T_{air}$ denotes a temperature of the environment where the thermal analysis target 41 is arranged.

In the thermal analysis target 141, an area in a plan view of the current detection element 143 is set as an area $S2_d$. The area $S2_d$ refers to an area of the hatched region in FIG. 3. A convection heat transfer coefficient due to convection of the heat quantity on the upper surface 93 side and the heat quantity on the lower surface 94 side of the substrate 42 is set as a convection heat transfer coefficient hc2. A temperature increased due to heat generation by the conductive layer 44 and the current detection element 143 is set as a temperature $T_{rise}2$. A relationship similar to Expressions 3-1 and 3-2 is established among the heat quantity Qc2, the area $S2_d$, the convection heat transfer coefficient hc2, and the temperature $T_{rise}2$. A relationship similar to Expression 4 is established between the heat quantity Qc2 and the area $S2_d$.

The resistance value $R_{sub}$ tends to fall when a pad is arranged right above a via hole (the opening 49 in the examples of FIG. 1 and FIG. 2) (which is so-called pad on via). The resistance value $R_{sub}$ also tends to fall when a plurality of wiring layers (the conductive layer 44-2-1 to the conductive layer 44-2-n in the examples of FIG. 1 and FIG. 2) are connected by a through hole (the opening 49 in the examples of FIG. 1 and FIG. 2). The resistance value $R1_p$ and the resistance value $R2_p$ respectively change in accordance with increases of the temperatures of the current detection element 43 and the current detection element 143.

In a case where the pad is arranged right above the via hole (the opening 49, for example) or a case where the plurality of wiring layers (the conductive layer 44-2-1 to the conductive layer 44-2-n, for example) are connected by the through hole (the opening 49, for example), the area $S_{sub}$ may further include an area of a region where the current flows in the conductive layer 44 which is an area on the lower surface 94 (see FIG. 2) side of the substrate 42 in the conductive layer 44.

When the thermal analysis target 41 is thermally analyzed, the temperature coefficient of resistance a may be stored in the storage unit 60 (see FIG. 4). The thermal analysis unit 40 (see FIG. 4) may thermally analyze the thermal analysis target 41 using the temperature coefficient of resistance a stored in the storage unit 60. When the thermal analysis target 141 is thermally analyzed, a value input in the second input region 53-2 (see FIG. 6) by the inputting unit 10 (see FIG. 4) may be used as the temperature coefficient of resistance a for the thermal analysis.

The convection heat transfer coefficient hc1 and the convection heat transfer coefficient hc2 may be derived based on at least one of the surface state of the substrate 42 and the arrangement direction of the substrate 42 which are input in the environment information input region 55 (see FIG. 6) by the inputting unit 10 (see FIG. 4). The thermal analysis unit 40 may thermally analyze the thermal analysis target 41 by using the derived convection heat transfer coefficient hc1, and thermally analyze the thermal analysis target 141 by using the derived convection heat transfer coefficient hc2.

In general, the heating value per unit time in the integrated circuit (IC) tends to depend on power consumption in accordance with drive of a transistor. In contrast, when the current detection element 43 is the magnetic sensor and the current detection element 143 is the shunt resistor, the heating value per unit time in the thermal analysis target 41 and the thermal analysis target 141 tends to depend on the area $S_{sub}$, the width W, the width W', the length L, and the length L'. For this reason, in the present example, the user of the design assist apparatus 100 can easily compare a behavior of the temperature $T_{rise}1$ in the thermal analysis target 41 with a behavior of temperature $T_{rise}2$ in the thermal analysis target 141 by changing the area $S_{sub}$, the width W, the width W', the length L, and the length L' in the thermal analysis target 41 and the thermal analysis target 141.

Figure 8:
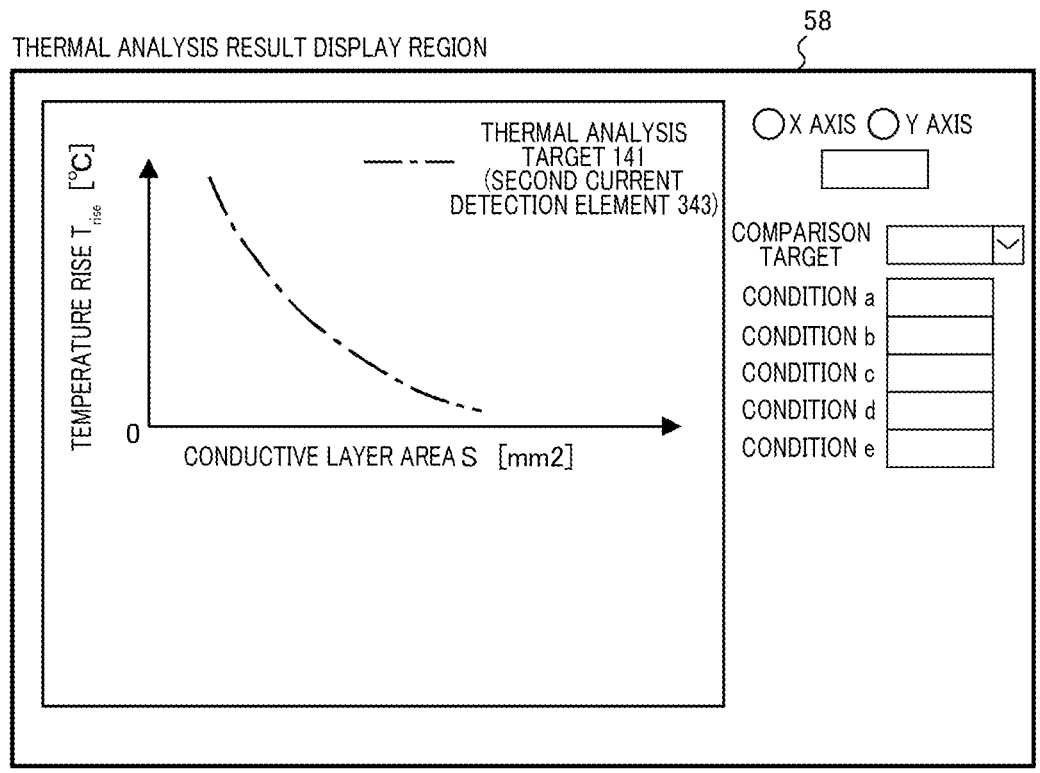
FIG. 8 is an enlarged view of the thermal analysis result display region 58 illustrated in FIG. 5.

FIG. 8 is an enlarged view of the thermal analysis result display region 58 illustrated in FIG. 5. In the present example, similarly as in the example illustrated in FIG. 7, the first information If1 is the conductive layer area S, and the second information If2 is the temperature rise $T_{rise}$.

When the first analysis condition Ia1 is input by the inputting unit 10 (see FIG. 4), the display control unit 32 (see FIG. 4) may control the display unit 50 to display the first thermal analysis result Ir1 based on the first analysis condition Ia1 on the display unit 50. In FIG. 8, the first thermal analysis result Ir1 is displayed using a one dot chain line on the thermal analysis result display region 58.

Figure 9:
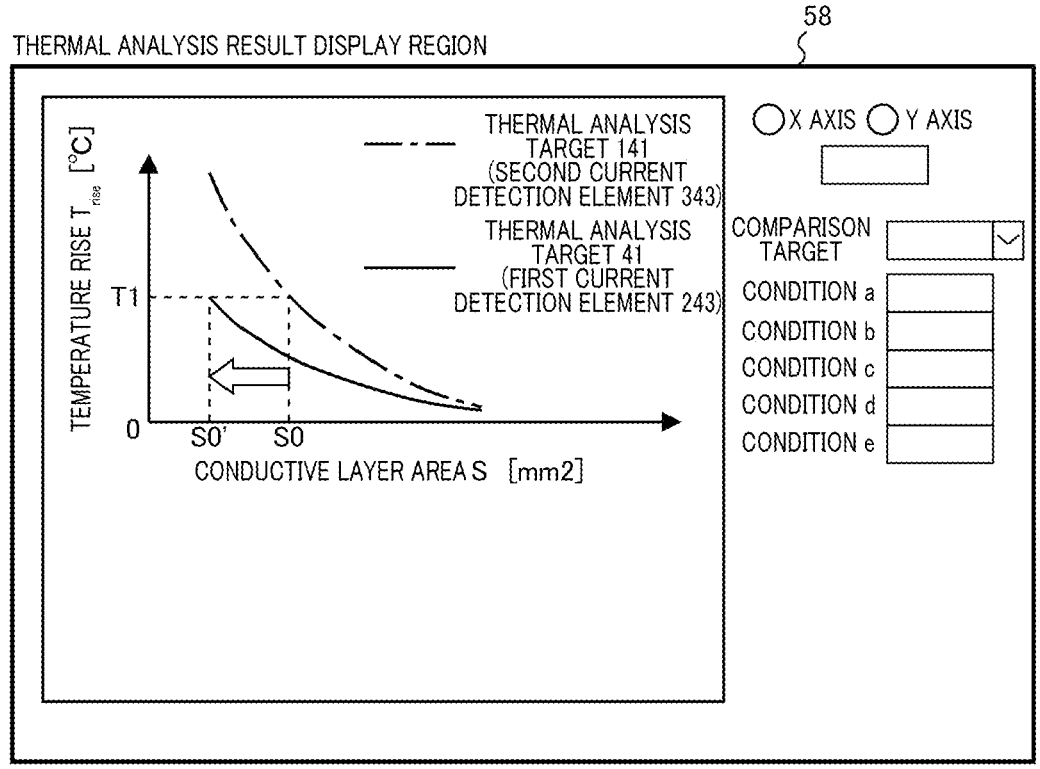
FIG. 9 is another enlarged view of the thermal analysis result display region 58 illustrated in FIG. 5.

FIG. 9 is another enlarged view of the thermal analysis result display region 58 illustrated in FIG. 5. In the present example, for the second analysis condition Ia2, the substrate information Is is identical to the first analysis condition Ia1, and the current detection element information Id is different from the first analysis condition Ia1. When the first analysis condition Ia1 is input by the inputting unit 10 (see FIG. 4) (that is, in the case of FIG. 8), the display control unit 32 (see FIG. 4) may control the display unit 50 to display, on the display unit 50 and in a mutually identifiable manner, the first thermal analysis result Ir1 and the second thermal analysis result Ir2 under a condition that the second analysis condition Ia2 is input.

The display control unit 32 may control the display unit 50 to display the second thermal analysis result Ir2 on the display unit 50, with the first thermal analysis result Ir1 being displayed on the display unit 50. When the first analysis condition Ia1 is input by the inputting unit 10 (see FIG. 4), the display control unit 32 may control the display unit 50 to further display the second thermal analysis result Ir2 on the display unit 50, with the first thermal analysis result Ir1 being displayed on the display unit 50 under a condition that the second analysis condition Ia2 is input. In the present example, the first current detection element information Id1 in the first analysis condition Ia1 is information related to the current detection element 43, and the second current detection element information Id2 in the second analysis condition Ia2 is information related to the current detection element 143.

The thermal analysis unit 40 (see FIG. 4) may thermally analyze the thermal analysis target 41 each time the second analysis condition Ia2 is input by the inputting unit 10. The display control unit 32 may control the display unit 50 to display the second thermal analysis result Ir2 on the display unit 50 each time the thermal analysis unit 40 thermally analyzes the thermal analysis target 41.

Figure 10:
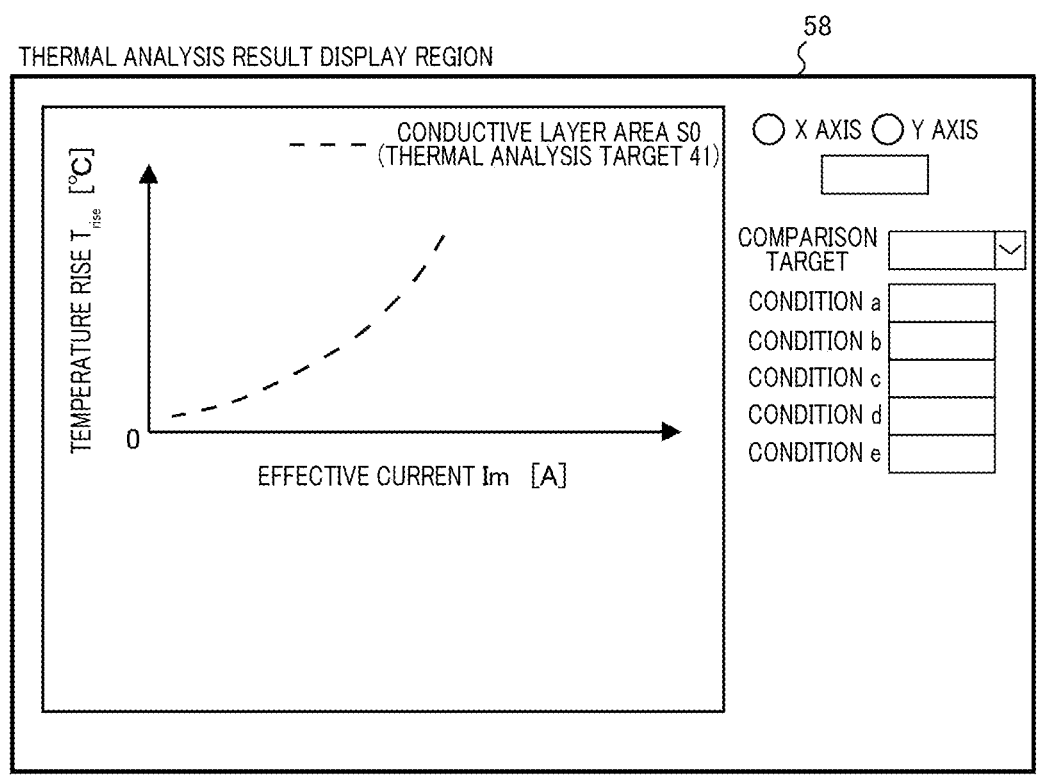
FIG. 10 is another enlarged view of the thermal analysis result display region 58 illustrated in FIG. 5.

FIG. 10 is another enlarged view of the thermal analysis result display region 58 illustrated in FIG. 5. In the present example, the first information If1 is an effective current Im, and the second information If2 is the temperature rise $T_{rise}$. The effective current Im is the effective value of the current I flowing in the conductive layer 44 as described above.

When the first analysis condition Ia1 is input by the inputting unit 10 (see FIG. 4), the display control unit 32 (see FIG. 4) may control the display unit 50 to display the first thermal analysis result Ir1 based on the first analysis condition Ia1 on the display unit 50. In FIG. 10, the first thermal analysis result Ir1 is displayed using a coarse broken line in the thermal analysis result display region 58.

Figure 11:
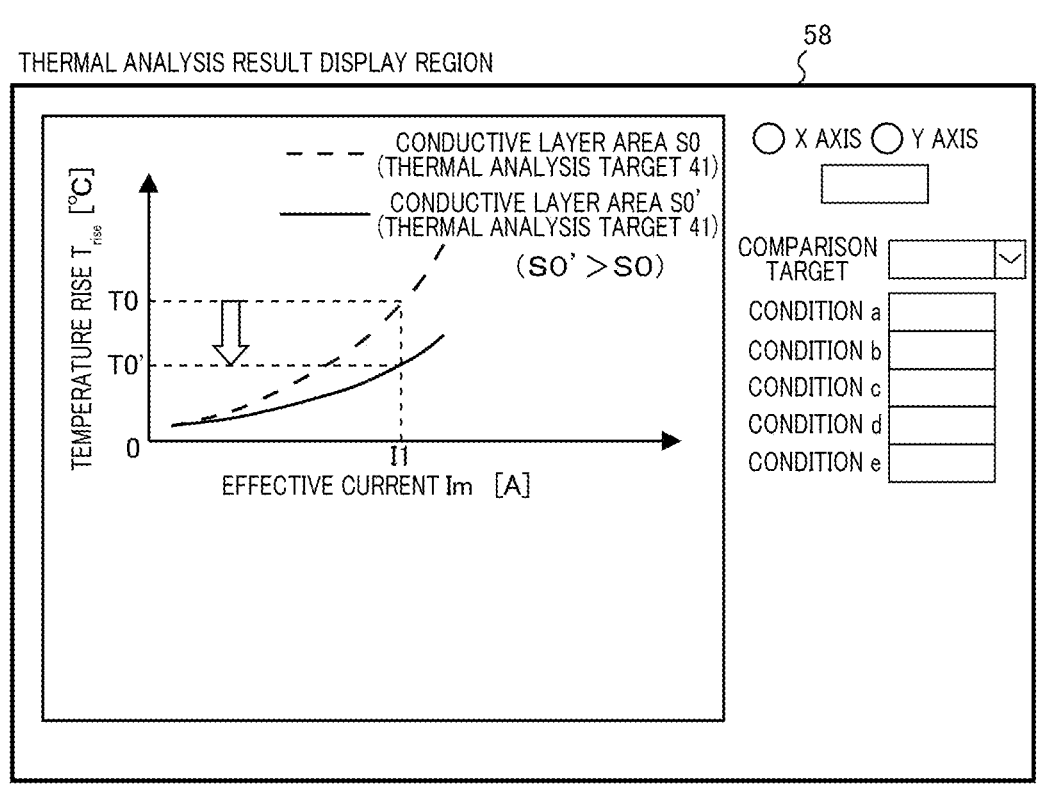
FIG. 11 is another enlarged view of the thermal analysis result display region 58 illustrated in FIG. 5.

FIG. 11 is another enlarged view of the thermal analysis result display region 58 illustrated in FIG. 5. In the present example, for the second analysis condition Ia2, the substrate information Is is different from the first analysis condition Ia1, and also the current detection element information Id is identical to the first analysis condition Ia1. In the present example, the first current detection element information Id1 and the second current detection element information Id2 are set as information related to the current detection element 43 (a magnetic sensor, for example).

When the first analysis condition Ia1 is input by the inputting unit 10 (see FIG. 4) (that is, in the case of FIG. 8), the display control unit 32 (see FIG. 4) may control the display unit 50 to display, on the display unit 50 and in a mutually identifiable manner, the first thermal analysis result Ir1 and the second thermal analysis result Ir2 under a condition that the second analysis condition Ia2 is input. When the first analysis condition Ia1 is input, the display control unit 32 may control the display unit 50 to further display the second thermal analysis result Ir2 on the display unit 50, with the first thermal analysis result Ir1 being displayed on the display unit 50 under a condition that the second analysis condition Ia2 is input. In the present example, the conductive layer area S of the substrate information Is1 in the first analysis condition Ia1 is an area S0, and the conductive layer area S of the substrate information Is2 in the second analysis condition Ia2 is an area S0' (>S0).

In the present example, in a case where the area S of the conductive layer 44 in the substrate 42 where the current detection element 43 (for example, the magnetic sensor) is provided is reduced, when the effective current Im is maintained at a current Ti, the user of the design assist apparatus 100 can easily understand a suppression effect of the temperature rise $T_{rise}$ from a temperature T0 to a temperature T0'.

In a side view of the substrate 42 illustrated in FIG. 2, among the plurality of conductive layers 44-2, the conductive layer 44-2-1 is set as a first conductive layer D1, and the conductive layer 44-2-2 is set as a second conductive layer D2. In a plan view of the substrate 42 illustrated in FIG. 1, when shapes of the first conductive layer D1 and the second conductive layer D2 are different from each other, the substrate information Is may include information of the first conductive layer D1 and information of the second conductive layer D2. The information of the first conductive layer D1 and the information of the second conductive layer D2 may be included in the analysis condition Ia.

When the thermal analysis unit 40 (see FIG. 4) has thermally analyzed the thermal analysis target 41, the setting unit 20 (see FIG. 4) may set the output form of the thermal analysis result Ir to be unchangeable. In the example illustrated in FIG. 7, the setting unit 20 sets the output form of the thermal analysis result Ir while the first information If1 is the conductive layer area S, and the second information If2 is the temperature rise $T_{rise}$. When the thermal analysis unit 40 has thermally analyzed the thermal analysis target 41, the setting unit 20 may set the first information If1 and the second information If2 to be unchangeable. When the first information If1 and the second information If2 are set to be unchangeable, even when the user of the design assist apparatus 100 attempts to change at least one of the first information If1 and the second information If2 by mistake, change of the at least one of the first information If1 and the second information If2 is avoided. For this reason, the display control unit 32 more easily controls the display unit 50 to display the thermal analysis result Ir on the display unit 50, with the first information If1 and the second information If2 being unchanged, each time the thermal analysis is performed by the thermal analysis unit 40.

In a case where the setting unit 20 (see FIG. 4) actually sets the form of the thermal analysis result Ir to be unchangeable, when the inputting unit 10 (see FIG. 4) inputs third information If3 selected from among the substrate information Is, the current detection element information Id, and the environment information Ie, the display control unit 32 may control the display unit 50 to display a warning on the display unit 50. The third information If3 is different from the first information If1 and also different from the second information If2.

Since the display control unit 32 controls the display unit 50 to display the warning on the display unit 50, the user of the design assist apparatus 100 can understand the attempt to change at least one of the first information If1 and the second information If2 by mistake. Note that instead of the display of the warning on the display unit 50 by the display control unit 32, the design assist apparatus 100 may also issue a warning sound.

In the example illustrated in FIG. 9, the first information If1 is the conductive layer area S, and the second information If2 is the temperature rise $T_{rise}$. In FIG. 9, the output form of the thermal analysis result Ir1 is set as a form representing the relationship between the first information If1 and the second information If2.

When the inputting unit 10 inputs the third information If3, the setting unit 20 may set the output form of the thermal analysis result Ir as a form representing a relationship between the third information If3 and the second information If2 from the form (form illustrated in FIG. 9) representing the relationship between the first information If1 and the second information If2. When the third information If3 is, for example, the effective current Im, the setting unit 20 may set the output form of the thermal analysis result Ir to a form illustrated in FIG. 11 from the form illustrated in FIG. 9. The display control unit 32 may control the display unit 50 to display, on the display unit 50 and in the form representing the relationship between the third information If3 and the second information If2, the first thermal analysis result Ir1 and the second thermal analysis result Ir2.

When the inputting unit 10 (see FIG. 4) inputs initialization of the output form of the thermal analysis result Ir, the setting unit 20 (see FIG. 4) may set the output form to be changeable. In the present example, when the inputting unit 10 presses the initialization part 63 (see FIG. 7), the setting unit 20 sets the output form of the thermal analysis result Ir to be changeable. When the inputting unit 10 inputs initialization of the output form of the thermal analysis result Ir, the setting unit 20 may set the first information If1 and the second information If2 to be changeable. When the inputting unit 10 inputs initialization of the output form of the thermal analysis result Ir, the display control unit 32 may control the display unit 50 to delete the thermal analysis result Ir displayed on the display unit 50 from the display unit 50.

Figure 12:
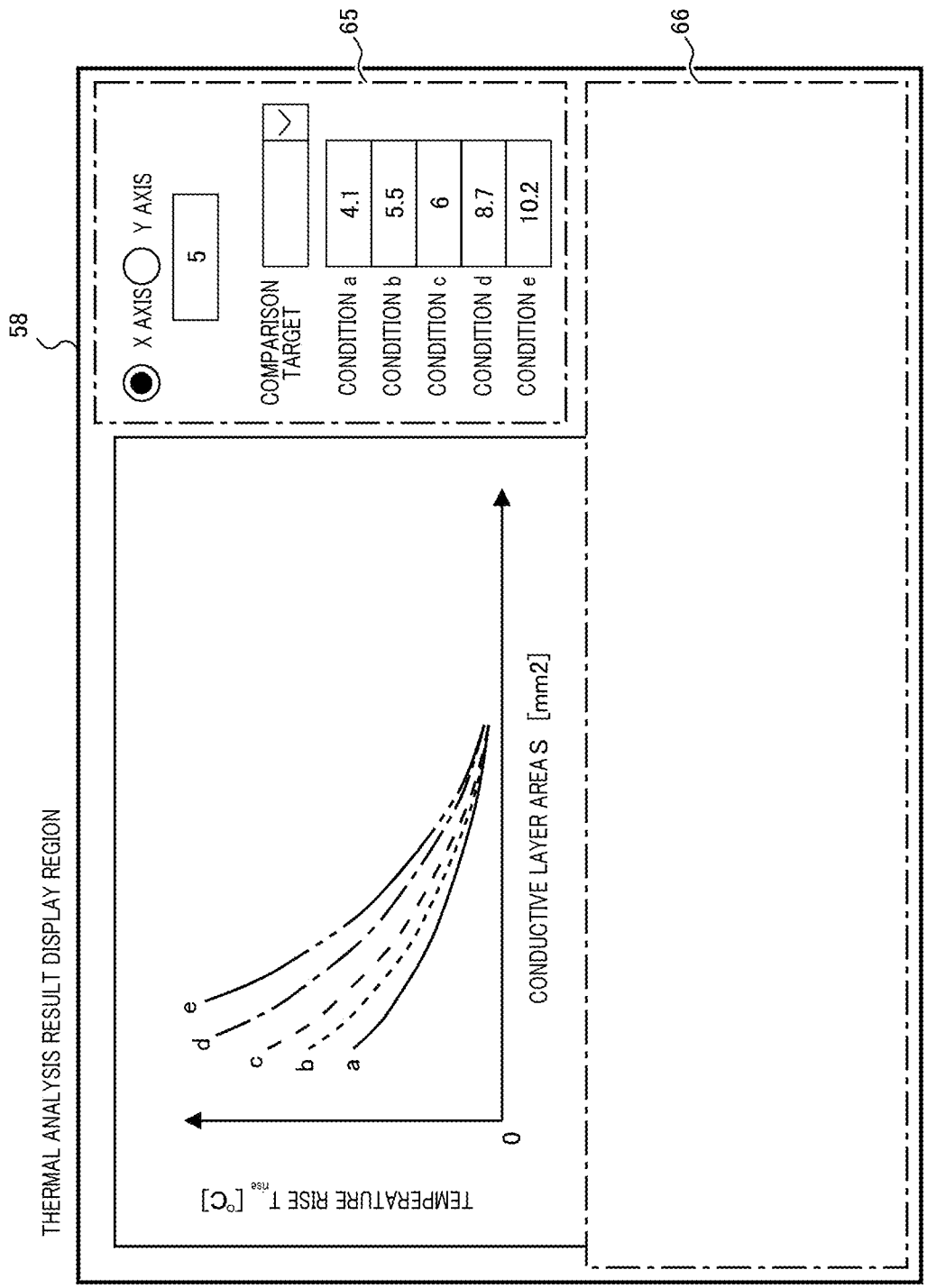
FIG. 12 is another enlarged view of the thermal analysis result display region 58 illustrated in FIG. 5.

FIG. 12 is another enlarged view of the thermal analysis result display region 58 illustrated in FIG. 5. The thermal analysis result display region 58 may include a calculation region 65 and an analysis condition display region 66. The analysis condition display region 66 is a region for displaying the thermal analysis result Ir of each of the analysis conditions Ia in a tabular form.

The display control unit 32 (see FIG. 4) may control the display unit 50 to display, on the calculation region 65, the thermal analysis result Ir of each of the analysis conditions Ia which is obtained by a calculation with regard to a specific numerical value of the first information If1 or the second information If2. In the present example, the first information If1 is the conductive layer area S, and the second information If2 is the temperature rise $T_{rise}$. In the present example, a result obtained by calculate the temperature rise $T_{rise}$ in a case where the conductive layer area S is 5 [mm$^2$] is illustrated in the calculation region 65 for each of the thermal analysis results Ir. The specific numerical value of the first information If1 or the second information If2 may be input by the inputting unit 10 (see FIG. 4).

FIG. 13 illustrates one example of the analysis condition display region 66 illustrated in FIG. 12. The display control unit 32 (see FIG. 4) may control the display unit 50 to display the first analysis condition Ia1 and the second analysis condition Ia2 on the display unit 50 (in the present example, the analysis condition display region 66). In the present example, the display control unit 32 controls the display unit 50 to display the analysis conditions Ia with analysis condition Ia numbers 1 to 6 on the analysis condition display region 66.

The display control unit 32 may control the display unit 50 to display a second thermal analysis condition Ia2 on the display unit 50, with a first thermal analysis condition Ia1 being displayed on the display unit 50. The display control unit 32 may control the display unit 50 to add display of the analysis condition Ia to the display unit 50 for each thermal analysis based on a different analysis condition Ia.

The display control unit 32 may control the display unit 50 to display, on the display unit 50 and in a mutually identifiable manner, differences between the first analysis condition Ia1 and the second analysis condition Ia2. In the example illustrated in FIG. 13, a case where the analysis condition Ia number is 1 corresponds to the first analysis condition Ia1, and a case where the number is 2 corresponds to the second analysis condition Ia2. In the present example, differences between the first analysis condition Ia1 and the second analysis condition Ia2 are resistance values of the current detection element 43. In the present example, the resistance value in the second analysis condition Ia2 is surrounded by a bold line frame such that the difference in the second analysis condition Ia2 from the first analysis condition Ia1 is identifiable. Note that the difference in the second analysis condition Ia2 from the first analysis condition Ia1 may be colored in the analysis condition display region 66 and displayed to be identifiable.

In the example illustrated in FIG. 13, a case where the analysis condition Ia number is 5 corresponds to the first analysis condition Ia1, and a case where the number is 6 corresponds to the second analysis condition Ia2. In the present example, differences between the first analysis condition Ia1 and the second analysis condition Ia2 are arrangement directions of the substrate 42. In the present example, the arrangement direction of the substrate 42 in the second analysis condition Ia2 is surrounded by a bold line frame.

In the example illustrated in FIG. 13, items regarding the size of the Z axis direction in the cases with the analysis condition Ia numbers 1 and 2 are surrounded by a bold dashed line. A region surrounded by the bold dashed line is set as a region D. The region D will be described below.

Figure 14:
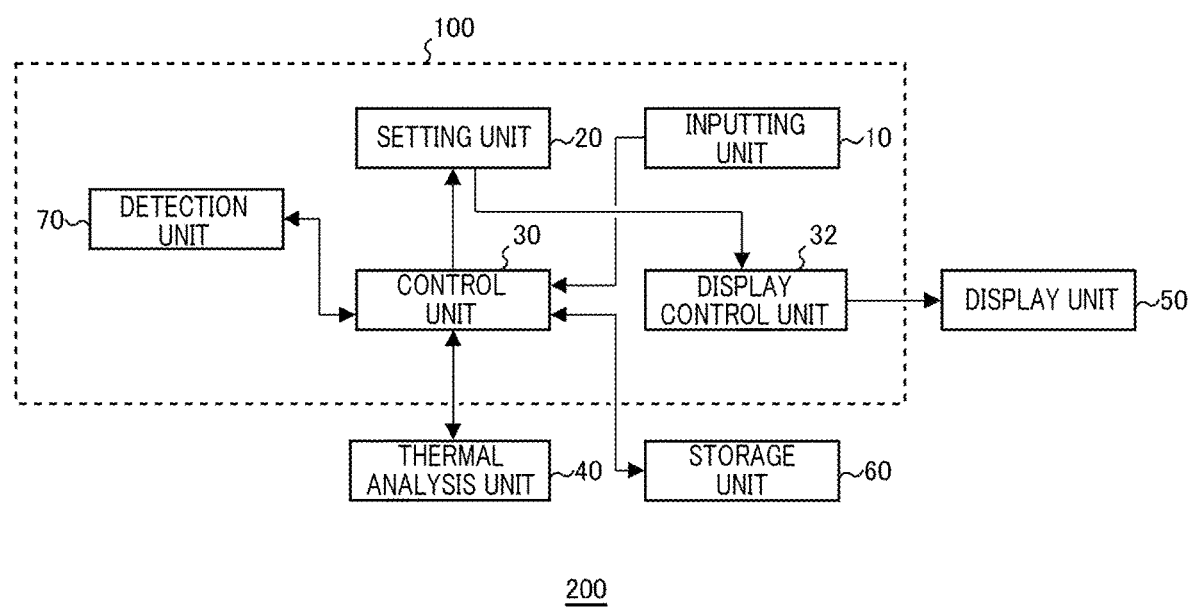
FIG. 14 illustrates another example of the design assist system 200 according to one embodiment of the present invention.

FIG. 14 illustrates another example of the design assist system 200 according to one embodiment of the present invention. In the design assist system 200 of the present example, the design assist apparatus 100 further includes a detection unit 70. The design assist system 200 of the present example is different from the design assist system illustrated in FIG. 4 in this regard.

The detection unit 70 may detect a height of the current detection element 43 based on the first current detection element information Id1. The display control unit 32 may control the display unit 50 to display the height of the current detection element 43 detected by the detection unit 70 on the display unit 50. The height of the current detection element 43 detected by the detection unit 70 may be displayed in the region D illustrated in FIG. 13.

When the current detection element 43 is the magnetic sensor and the current detection element 143 is the shunt resistor, a configuration of a current detection unit using the current detection element 43 tends to be smaller than a configuration of the current detection unit using the current detection element 143. The configuration of the current detection unit may be a height of the current detection unit. For this reason, a size of an apparatus using the current detection element 43 tends to be smaller than a size of an apparatus using the current detection element 143. In the present example, the user of the design assist apparatus 100 more easily compares the height and the conductive layer area of the current detection element 43 which are illustrated in the region D in FIG. 13 and the height and the conductive layer area of the current detection element 143 with each other.

Figure 15:
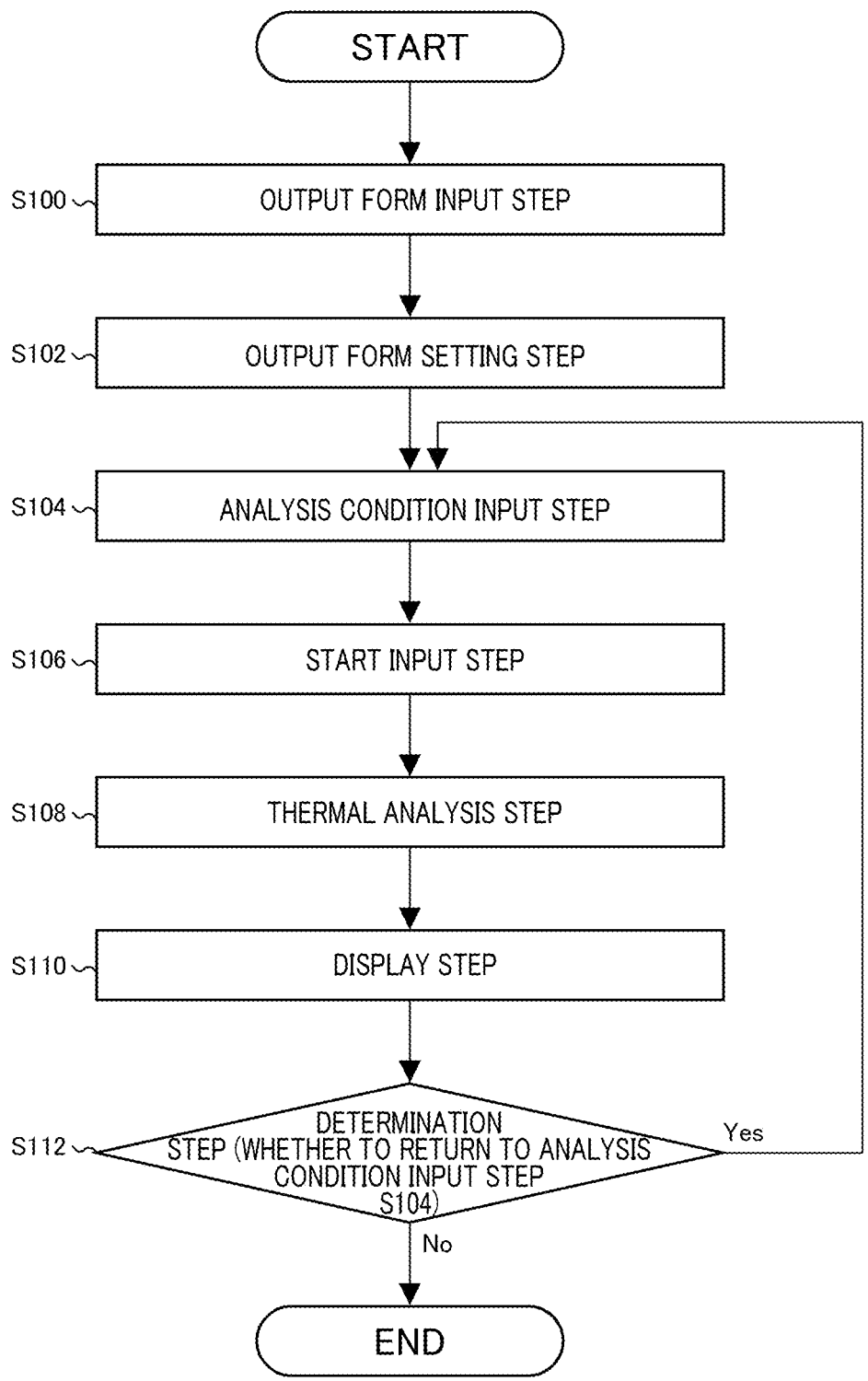
FIG. 15 is a flowchart illustrating one example of a design assist method according to one embodiment of the present invention.

FIG. 15 is a flowchart illustrating one example of a design assist method according to one embodiment of the present invention. The design assist method according to one embodiment of the present invention is one example of a design assist method in a case where the design assist system 200 (see FIG. 4) is used.

The design assist method includes an output form setting step S102, an analysis condition input step S104, and a display step S110. The design assist method may include an output form input step S100, a start input step S106, a thermal analysis step S108, and a determination step S112.

The output form input step S100 is a step for the inputting unit 10 (see FIG. 4) to set the output form of the thermal analysis result Ir. The output form input step S100 may be a step for the inputting unit 10 to input the first information If1 and the second information If2 from the substrate information Is, the current detection element information Id, and the environment information Ie.

The output form setting step S102 is a step for the setting unit 20 (see FIG. 4) to set the output form of the thermal analysis result Ir. In the output form setting step S102, the setting unit 20 may set the output form of the thermal analysis result Ir as the output form input in the output form input step S100. The output form setting step S102 may be a step of setting the output form of the thermal analysis result Ir as a form representing a relationship between the first information If1 and the second information If2.

The analysis condition input step S104 is a step for the inputting unit 10 (see FIG. 4) to input the analysis condition Ia including the substrate information Is and the current detection element information Id. The substrate information Is is information of at least one of the substrate 42 in the thermal analysis target 41 and the substrate 42 in the thermal analysis target 141. The current detection element information Id is at least one of the information of the current detection element 43 and the information of the current detection element 143.

The analysis condition input step S104 may be a step for the inputting unit 10 to input at least one of the first current detection element information Id1 and the second current detection element information Id2. The first current detection element information Id1 is the current detection element information Id related to the first current detection element 243 (the current detection element 43). The second current detection element information Id2 is the current detection element information Id related to the second current detection element 343 (the current detection element 143).

In the analysis condition input step S104, the inputting unit 10 may input the first analysis condition Ia1 and the second analysis condition Ia2. As described above, the second analysis condition Ia2 is the analysis condition Ia obtained by changing at least one of the substrate information Is and the current detection element information Id from the first analysis condition Ia1.

The analysis condition Ia may further include the environment information Ie of at least one of the thermal analysis target 41 and the thermal analysis target 141. The environment information Ie may include at least one of the temperature of the environment of at least one of the thermal analysis target 41 and the thermal analysis target 141, the convection heat transfer coefficient of the environment, and the radiation heat transfer coefficient of the environment.

The start input step S106 is a step for the inputting unit 10 (see FIG. 4) to input start of the thermal analysis of the thermal analysis target 41 or the thermal analysis target 141. The thermal analysis step S108 is a step for the thermal analysis unit 40 (see FIG. 4) to thermally analyze the thermal analysis target 41 or the thermal analysis target 141.

When the inputting unit 10 inputs the start of the thermal analysis of the thermal analysis target 41 in the start input step S106, the thermal analysis unit 40 thermally analyzes the thermal analysis target 41 based on the first analysis condition Ia1 including the current detection element information Id1 of the first current detection element 243 (the current detection element 43) in the thermal analysis step S108. When the inputting unit 10 inputs the start of the thermal analysis of the thermal analysis target 141 in the start input step S106, the thermal analysis unit 40 thermally analyzes the thermal analysis target 141 based on the second analysis condition Ia2 including the current detection element information Id2 of the second current detection element 343 (the current detection element 143) in the thermal analysis step S108.

The display step S110 is a step for the display control unit 32 to display the thermal analysis result Ir based on the analysis condition Ia on the display unit 50 in the output form set in the output form setting step S102. The display step S110 is a step for displaying, on the display unit 50 and in a mutually identifiable manner, the first thermal analysis result Ir1 based on the first analysis condition Ia1 and the second thermal analysis result Ir2 based on the second analysis condition Ia2 which are input in the analysis condition input step S104.

The thermal analysis step S108 may include a first thermal analysis step S108-1 for the thermal analysis unit 40 to thermally analyze one of the thermal analysis target 41 and the thermal analysis target 141 based on the first analysis condition Ia1, and a second thermal analysis step S108-2 for the thermal analysis unit 40 to thermally analyze the other of the thermal analysis target 41 and the thermal analysis target 141 based on the second analysis condition Ia2.

The determination step S112 is a step for the control unit 30 (see FIG. 4) to determine whether to return to the analysis condition input step S104 after the first thermal analysis step S108-1. In the determination step S112, when the control unit 30 determines to return to the analysis condition input step S104, the thermal analysis unit 40 may perform the second thermal analysis step S108-2.

Various embodiments of the present invention may be described with reference to a flowchart and a block diagram. According to the various embodiments of the present invention, a block may represent (1) a step of a process where operations are executed or (2) a section of an apparatus having a role for executing operations.

A specific step may be executed by a dedicated circuit, a programmable circuit, or a processor. A specific section may be implemented by a dedicated circuit, a programmable circuit, or a processor. The programmable circuit and the processor may be supplied together with a computer readable instruction. The computer readable instruction may be stored on a computer readable medium.

The dedicated circuit may include at least one of a digital hardware circuit and an analog hardware circuit. The dedicated circuit may include at least one of an integrated circuit (IC) and a discrete circuit. The programmable circuit may a hardware circuit including include logical AND, logical OR, logical XOR, logical NAND, logical NOR, and other logical operations. The programmable circuit may include a reconfigurable hardware circuit including a flip-flop, a register, a memory element such as a field programmable gate array (FPGA) and a programmable logic array (PLA), and the like.

The computer readable medium may include any tangible device capable of storing an instruction executed by an appropriate device. Since the computer readable medium includes the tangible device, the computer readable medium having the instruction stored on the device constitutes a product including an instruction that may be executed in order to provide means to execute an operation specified by a flowchart or a block diagram.

The computer readable medium may be, for example, an electronic storage medium, a magnetic storage medium, an optical storage medium, an electromagnetic storage medium, a semiconductor storage medium, or the like. More specifically, for example, the computer readable medium may be a floppy (registered trademark) disk, a diskette, a hard disk, a random access memory (RAM), a read only memory (ROM), an erasable programmable read only memory (EPROM or flash memory), an electrically erasable programmable read only memory (EEPROM), a static random access memory (SRAM), a compact disk read only memory (CD-ROM), a digital versatile disk (DVD), a Blu-ray (registered trademark) disk, a memory stick, an integrated circuit card, or the like.

The computer readable instruction may include any of an assembler instruction, an instruction-set-architecture (ISA) instruction, a machine instruction, a machine dependent instruction, a microcode, a firmware instruction, state-setting data, a source code, and an object code. The source code and the object code may be written in any combination of one or more programming languages including an object oriented programming language and a procedural programming language in related art. The object oriented programming language may be, for example, Smalltalk (registered trademark), JAVA (registered trademark), C++, or the like. The procedural programming language may be, for example, a "C" programming language.

The computer readable instruction may be provided to a general purpose computer, a special purpose computer, or a processor or a programmable circuit of another programmable data processing apparatus locally or via a local area network (LAN) or a wide area network (WAN) such as the Internet. The general purpose computer, the special purpose computer, or the processor or the programmable circuit of the other programmable data processing apparatus may execute the computer readable instruction to provide means to execute operations specified by the flowchart illustrated in FIG. 15 or the block diagrams illustrated in FIG. 4 and FIG. 14. The processor may be, for example, a computer processor, a processing unit, a microprocessor, a digital signal processor, a controller, a microcontroller, or the like.

Figure 16:
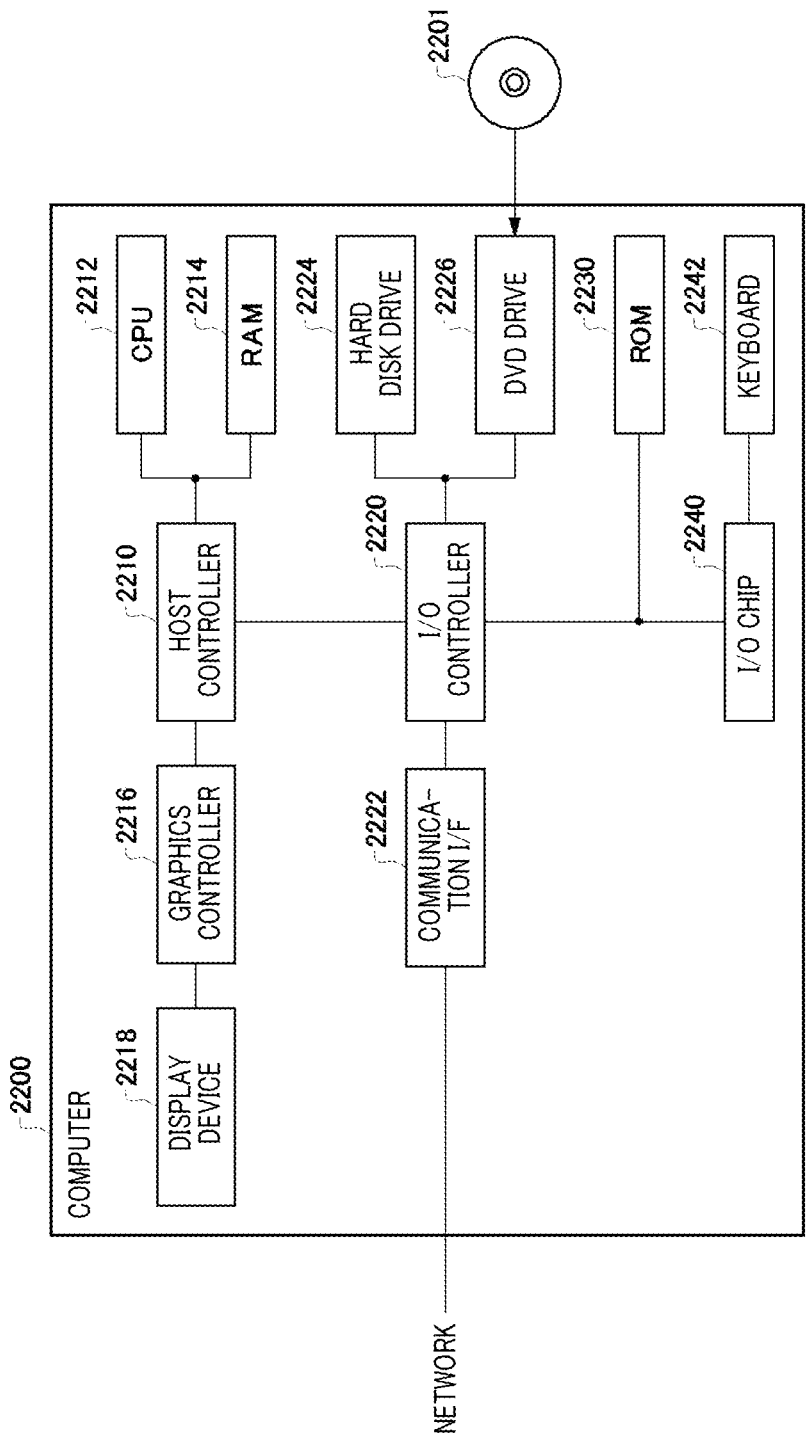
FIG. 16 illustrates one example of a computer 2200 through which a design assist apparatus 100 according to an embodiment of the present invention may be entirely or partially embodied.

FIG. 16 illustrates one example of a computer 2200 through which the design assist apparatus 100 according to the embodiment of the present invention may be entirely or partially embodied. A program that is installed in the computer 2200 can cause the computer 2200 to function as or perform operations associated with the design assist apparatus 100 according to the embodiments of the present invention or one or more sections of the design assist apparatus 100, or perform the operations or the one or more sections, or cause the computer 2200 to perform the respective steps (see FIG. 15) according to the design assist method the present invention or steps of the processes. The program may be executed by the CPU 2212 to cause the computer 2200 to perform certain operations associated with some or all of the blocks of the flowchart (FIG. 15) and the block diagrams (FIG. 4 and FIG. 14) which are described in the present specification.

The computer 2200 according to the present embodiment includes a CPU 2212, a RAM 2214, a graphics controller 2216, and a display device 2218. The CPU 2212, the RAM 2214, the graphics controller 2216, and the display device 2218 are mutually connected by a host controller 2210. The computer 2200 further includes input and output units such as a communication interface 2222, a hard disk drive 2224, a DVD-ROM drive 2226, and an IC card drive. The communication interface 2222, the hard disk drive 2224, the DVD-ROM drive 2226, and the IC card drive, and the like are connected to the host controller 2210 via an input and output controller 2220. The computer further includes legacy input and output units such as a ROM 2230 and a keyboard 2242. The ROM 2230, the keyboard 2242, and the like are connected to the input and output controller 2220 through an input and output chip 2240.

The CPU 2212 operates according to programs stored in the ROM 2230 and the RAM 2214, thereby controlling each unit. The graphics controller 2216 obtains image data generated by the CPU 2212 on a frame buffer or the like provided in the RAM 2214 or in the RAM 2214 itself to cause the image data to be displayed on the display device 2218.

The communication interface 2222 communicates with other electronic devices via a network. The hard disk drive 2224 stores programs and data used by the CPU 2212 within the computer 2200. The DVD-ROM drive 2226 reads the programs or the data from the DVD-ROM 2201, and provides the read programs or data to the hard disk drive 2224 via the RAM 2214. The IC card drive reads programs and data from an IC card, or writes programs and data to the IC card.

The ROM 2230 stores a boot program or the like executed by the computer 2200 at the time of activation, or a program depending on the hardware of the computer 2200. The input and output chip 2240 may connect various input and output units via a parallel port, a serial port, a keyboard port, a mouse port, or the like to the input and output controller 2220.

A program is provided by a computer readable media such as the DVD-ROM 2201 or the IC card. The program is read from the computer readable media, installed into the hard disk drive 2224, RAM 2214, or ROM 2230, which are also examples of computer readable media, and executed by the CPU 2212. The information processing described in these programs is read into the computer 2200, resulting in cooperation between a program and the above-mentioned various types of hardware resources. An apparatus or method may be constituted by realizing the operation or processing of information in accordance with the usage of the computer 2200.

For example, when a communication is performed between the computer 2200 and an external device, the CPU 2212 may execute a communication program loaded onto the RAM 2214 to instruct communication processing to the communication interface 2222, based on the processing described in the communication program. The communication interface 2222, under control of the CPU 2212, reads transmission data stored on a transmission buffering region provided in a recording medium such as the RAM 2214, the hard disk drive 2224, the DVD-ROM 2201, or the IC card, and transmits the read transmission data to a network or writes reception data received from a network to a reception buffering region or the like provided on the recording medium.

The CPU 2212 may cause all or a necessary portion of a file or a database to be read into the RAM 2214, the file or the database having been stored in an external recording medium such as the hard disk drive 2224, the DVD-ROM drive 2226 (DVD-ROM 2201), the IC card, or the like. The CPU 2212 may perform various types of processing on the data on the RAM 2214. The CPU 2212 may then write back the processed data to the external recording medium.

Various types of information, such as various types of programs, data, tables, and databases, may be stored in the recording medium to undergo information processing. The CPU 2212 may perform various types of processing on the data read from the RAM 2214, which includes various types of operations, processing of information, condition judging, conditional branch, unconditional branch, search or replace of information, or the like, as described throughout the present disclosure and designated by an instruction sequence of programs. The CPU 2212 may write the result back to the RAM 2214.

The CPU 2212 may search for information in a file, a database, or the like in the recording medium. For example, when a plurality of entries, each having an attribute value of a first attribute associated with an attribute value of a second attribute, are stored in the recording medium, the CPU 2212 may search for an entry matching the condition whose attribute value of the first attribute is designated, from among the plurality of entries, read the attribute value of the second attribute stored in the entry, and read a second attribute value to obtain the attribute value of the second attribute associated with the first attribute satisfying the predetermined condition.

The above-explained program or software modules may be stored in the computer readable media on the computer 2200 or of the computer 2200. A recording medium such as a hard disk or a RAM provided in a server system connected to a dedicated communication network or the Internet can be used as the computer readable media. The program may be provided to the computer 2200 by the recording medium.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES 10 inputting unit, 20 setting unit, 30 control unit, 32 display control unit, 40 thermal analysis unit, 41 thermal analysis target, 42 substrate, 43 current detection element, 44 conductive layer, 46 connection terminal, 47 conductive layer, 48 opening, 49 opening, 50 display unit, 51 output form input region, 52 current detection element information input region, 53 input region, 54 substrate information input region, 55 environment information input region, 56 thermal analysis execution region, 57 saving execution region, 58 thermal analysis result display region, 59 analysis condition input region, 60 storage unit, 61 first start part, 62 second start part, 63 initialization part, 64 saving part, 65 calculation region, 66 analysis condition display region, 70 detection unit, 91 via, 92 via, 93 upper surface, 94 lower surface, 100 design assist apparatus, 141 thermal analysis target, 143 current detection element, 200 design assist system, 243 first current detection element, 343 second current detection element, 2200 computer, 2201 DVD-ROM, 2210 host controller, 2212 CPU, 2214 RAM, 2216 graphics controller, 2218 display device, 2220 input and output controller, 2222 communication interface, 2224 hard disk drive, 2226 DVD-ROM drive, 2230 ROM, 2240 input and output chip

What is claimed is:

1. A design assist apparatus comprising:
an inputting unit configured to input an analysis condition including substrate information of a thermal analysis target and current detection element information; and
a display control unit configured to control a display unit to display, on the display unit, a thermal analysis result based on the analysis condition, wherein
the display control unit is configured to control the display unit to display, on the display unit and in a mutually identifiable manner, a first thermal analysis result based on a first analysis condition input by the inputting unit and a second thermal analysis result based on a second analysis condition obtained by changing at least one of the substrate information and the current detection element information from the first analysis condition;
the analysis condition further includes environment information of the thermal analysis target; and
the environment information includes at least one of a temperature of an environment of the thermal analysis target, a convection heat transfer coefficient of the environment, and a radiation heat transfer coefficient of the environment; and
a setting unit configured to set an output form of the thermal analysis result from a thermal analysis by a thermal analysis unit, wherein:
the inputting unit is configured to input first information and second information different from the first information which are selected from among the substrate information, the current detection element information, and the environment information;
the setting unit is configured to set the output form to a form representing a relationship between the first information and the second information; and the display control unit is configured to control the display unit to display, on the display unit and in the form set by the setting unit, the first thermal analysis result and the second thermal analysis result.

2. The design assist apparatus according to claim 1, wherein when the first analysis condition is input by the inputting unit, under a condition that the substrate information identical to the first analysis condition and the current detection element information different from the first analysis condition are input as the second analysis condition, the display control unit is configured to control the display unit to display, on the display unit and in a mutually identifiable manner, the first thermal analysis result and the second thermal analysis result.

3. The design assist apparatus according to claim 1, wherein when the first analysis condition is input by the inputting unit, under a condition that the substrate information different from the first analysis condition and the current detection element information identical to the first analysis condition are input as the second analysis condition, the display control unit is configured to control the display unit to display, on the display unit and in a mutually identifiable manner, the first thermal analysis result and the second thermal analysis result.

4. The design assist apparatus according to claim 1, wherein:
the current detection element information includes a temperature coefficient of resistance of a current detection element; and
the display control unit is configured to control the display unit to display the current detection element information on the display unit.

5. The design assist apparatus according to claim 1, wherein:
the current detection element information includes at least one of a size of a current detection element and a resistance value of the current detection element; and
the display control unit is configured to control the display unit to display the current detection element information on the display unit.

6. The design assist apparatus according to claim 1, wherein:
a substrate related to the thermal analysis target has one conductive layer or a plurality of conductive layers provided in a thickness direction of the substrate;
the substrate information includes at least one of the number of the conductive layers, a thickness of the conductive layers, and an area of the conductive layers; and
the display control unit is configured to control the display unit to display the substrate information on the display unit.

7. The design assist apparatus according to claim 6, wherein shapes of the plurality of conductive layers are the same in a plan view of the substrate.

8. The design assist apparatus according to claim 6, wherein when shapes of a first conductive layer and a second conductive layer among the plurality of conductive layers are different from each other in a plan view of the substrate, the substrate information includes information of the first conductive layer and information of the second conductive layer.

9. The design assist apparatus according to claim 6, wherein the environment information further includes at least one of a surface state of the substrate and an arrangement direction of the substrate.

10. The design assist apparatus according to claim 6, wherein the environment information further includes a value of an effective current flowing in the conductive layer.

11. The design assist apparatus according to claim 1, wherein when the thermal analysis unit has thermally analyzed the thermal analysis target, the setting unit is configured to set the form to be unchangeable.

12. The design assist apparatus according to claim 1, wherein:
in a case where the output form is set as the form, when the inputting unit inputs third information different from the first information and also different from the second information which are selected from among the substrate information, the current detection element information, and the environment information, the setting unit is configured to set the output form to a form representing a relationship between the third information and the second information from the form representing the relationship between the first information and the second information; and
the display control unit is configured to control the display unit to display, on the display unit and in the form representing the relationship between the third information and the second information, the first thermal analysis result and the second thermal analysis result.

13. The design assist apparatus according to claim 1 wherein:
the thermal analysis unit is configured to thermally analyze the thermal analysis target each time the second analysis condition is input by the inputting unit; and
the display control unit is configured to control the display unit to display the second thermal analysis result on the display unit each time the thermal analysis unit thermally analyzes the thermal analysis target.

14. The design assist apparatus according to claim 1, wherein the display control unit is configured to control the display unit to further display the first analysis condition and the second analysis condition on the display unit, and also control the display unit to display, on the display unit in a mutually identifiable manner, differences between the first analysis condition and the second analysis condition.

15. The design assist apparatus according to claim 1, wherein:
the inputting unit is configured to input at least one of first current detection element information that is the current detection element information related to a first current detection element and second current detection element information that is the current detection element information related to a second current detection element different from the first current detection element;
when the inputting unit inputs start of the thermal analysis of the thermal analysis target including the first current detection element, the thermal analysis unit is configured to thermally analyze the thermal analysis target based on the first analysis condition including the first current detection element information; and
when the inputting unit inputs start of the thermal analysis of the thermal analysis target including the second current detection element, the thermal analysis unit is configured to thermally analyze the thermal analysis target based on the second analysis condition including the second current detection element information.

16. A design assist method comprising:
inputting, by an inputting unit, an analysis condition including substrate information of a thermal analysis target and current detection element information; and displaying, by a display control unit, a thermal analysis result based on the analysis condition on a display unit, wherein the display includes displaying, on the display unit and in a mutually identifiable manner, a first thermal analysis result based on a first analysis condition input in the input and a second thermal analysis result based on a second analysis condition obtained by changing at least one of the substrate information and the current detection element information from the first analysis condition;

the analysis condition further includes environment information of the thermal analysis target; and the environment information includes at least one of a temperature of an environment of the thermal analysis target, a convection heat transfer coefficient of the environment, and a radiation heat transfer coefficient of the environment; and setting, by a setting unit, an output form of the thermal analysis result from a thermal analysis by a thermal analysis unit, wherein:

the inputting includes inputting first information and second information different from the first information which are selected from among the substrate information, the current detection element information, and the environment information;

the setting includes setting the output form to a form representing a relationship between the first information and the second information; and the displaying, by the display control unit, includes controlling the display unit to display, on the display unit and in the set output form, the first thermal analysis result and the second thermal analysis result.

17. A non-transitory computer readable medium having recorded thereon a program that, when executed by a computer, causes the computer to perform operations comprising:

inputting an analysis condition including substrate information of a thermal analysis target and current detection element information; and displaying a thermal analysis result based on the analysis condition on a display unit, wherein the display includes displaying, on the display unit and in a mutually identifiable manner, a first thermal analysis result based on a first analysis condition input in the input and a second thermal analysis result based on a second analysis condition obtained by changing at least one of the substrate information and the current detection element information from the first analysis condition;

the analysis condition further includes environment information of the thermal analysis target; and the environment information includes at least one of a temperature of an environment of the thermal analysis target, a convection heat transfer coefficient of the environment, and a radiation heat transfer coefficient of the environment; and setting, by a setting unit, an output form of the thermal analysis result from a thermal analysis by a thermal analysis unit, wherein:

the inputting includes inputting first information and second information different from the first information which are selected from among the substrate information, the current detection element information, and the environment information;

the setting includes setting the output form to a form representing a relationship between the first information and the second information; and the displaying includes controlling the display unit to display, on the display unit and in the set output form, the first thermal analysis result and the second thermal analysis result.

18. A design assist system comprising:
the design assist apparatus according to claim 1;
the display unit; and
a storage unit, wherein
the storage unit stores at least one of the substrate information, the current detection element information, and the thermal analysis result.

* * * * *